(12) United States Patent
Kurita et al.

(10) Patent No.: US 9,389,808 B2
(45) Date of Patent: Jul. 12, 2016

(54) STORAGE DEVICE AND DATA PROCESSING METHOD

(71) Applicant: Kabushiki Kaisha Toshiba, Minato-ku (JP)

(72) Inventors: Takahiro Kurita, Sagamihara (JP); Yuki Sasaki, Yokohama (JP); Atsuhiro Kinoshita, Kamakura (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 222 days.

(21) Appl. No.: 14/202,877

(22) Filed: Mar. 10, 2014

(65) Prior Publication Data

US 2015/0058436 A1  Feb. 26, 2015

(30) Foreign Application Priority Data

Aug. 22, 2013 (JP) .................................. 2013-172500

(51) Int. Cl.
*G06F 15/167* (2006.01)
*G06F 3/06* (2006.01)

(52) U.S. Cl.
CPC ............ *G06F 3/0683* (2013.01); *G06F 3/0605* (2013.01); *G06F 3/0635* (2013.01); *G06F 3/0658* (2013.01); *G06F 15/167* (2013.01)

(58) Field of Classification Search
CPC ... G06F 3/0605; G06F 3/0683; G06F 3/0656; G06F 3/0658; G06F 3/0635; G06F 15/167; G06F 15/163; G06F 15/173; G06F 15/16
See application file for complete search history.

(56) References Cited

U.S. PATENT DOCUMENTS

| 6,424,625 B1 | 7/2002 | Larsson et al. |
| 6,457,100 B1 | 9/2002 | Ignatowski et al. |

(Continued)

FOREIGN PATENT DOCUMENTS

| JP | 2003-345531 A | 12/2003 |
| JP | 2003-345531 A5 | 12/2003 |

(Continued)

OTHER PUBLICATIONS

Combined Office Action and Search Report issued Sep. 23, 2015 in Taiwanese Patent Application No. 103105911 (with English translation of category of Office Action).

(Continued)

*Primary Examiner* — Cheikh Ndiaye
(74) *Attorney, Agent, or Firm* — Oblon, McClelland, Maier & Neustadt, L.L.P

(57) ABSTRACT

A storage device according to an embodiment includes a plurality of memory nodes and a first connection unit. Each memory node includes nonvolatile memory and is connected to each other in two or more different directions. The first connection unit adds a first lifetime to a command which is externally supplied, and transmits the command including the first lifetime to a first memory node. A second memory node having received the command among the plural memory nodes, if the second memory node is not a destination of the command, subtracts the first lifetime added to the first command. The second memory node discards the command after the subtraction when the first lifetime after the subtraction is less than a threshold. The second memory node transfers the command after the subtraction to the adjacent memory node when the first lifetime after the subtraction is larger than the threshold.

11 Claims, 23 Drawing Sheets

(56) References Cited

U.S. PATENT DOCUMENTS

| | | | |
|---|---|---|---|
| 7,016,213 B2 | 3/2006 | Reeves et al. | |
| 7,421,525 B2 | 9/2008 | Polzin et al. | |
| 7,457,916 B2 | 11/2008 | Suzuki et al. | |
| 8,549,092 B2 | 10/2013 | Resnick | |
| 2003/0156093 A1* | 8/2003 | Niida | H04L 12/40052 345/156 |
| 2004/0153728 A1 | 8/2004 | Suzuki et al. | |
| 2005/0071542 A1 | 3/2005 | Weber et al. | |
| 2005/0166006 A1 | 7/2005 | Talbot et al. | |
| 2007/0124532 A1 | 5/2007 | Bennett | |
| 2007/0250604 A1* | 10/2007 | Wu | H04L 12/00 709/220 |
| 2009/0196227 A1* | 8/2009 | Bahr | H04L 45/20 370/328 |
| 2009/0216924 A1 | 8/2009 | Bennett | |
| 2010/0211721 A1 | 8/2010 | Resnick | |
| 2010/0241783 A1* | 9/2010 | Garcia | G06F 13/1684 711/5 |
| 2012/0117354 A1* | 5/2012 | Tatsumura | H04L 12/6418 711/200 |

FOREIGN PATENT DOCUMENTS

| | | |
|---|---|---|
| JP | 2003-348140 A | 12/2003 |
| JP | 3722415 | 11/2005 |
| JP | 3817426 | 9/2006 |
| JP | 2006-528394 | 12/2006 |
| JP | 2008-537265 A | 9/2008 |
| JP | 2008-537265 A5 | 9/2008 |
| JP | 2010-171557 | 8/2010 |
| JP | 2010-531104 A | 9/2010 |
| JP | 2010-262631 | 11/2010 |
| JP | 2012-103926 | 5/2012 |
| JP | 2012-518843 | 8/2012 |
| JP | 2015-41290 A | 3/2015 |
| JP | 2015-41291 A | 3/2015 |
| WO | WO 00/25470 | 5/2000 |
| WO | WO 2004/102403 A3 | 11/2004 |
| WO | WO 2006/115896 A3 | 11/2006 |
| WO | WO 2010/096569 A3 | 8/2010 |

OTHER PUBLICATIONS

Notice of Rejection issued Jan. 19, 2016 in Japanese Patent Application No. 2013-172500 (with English language translation).

* cited by examiner

| PACKET DESTINATION | PACKET SOURCE | COMMAND | LIFETIME |

FIG.22

| SYNDROME ($R_1R_2R_3R_4$) | ERROR POSITION |
|---|---|
| 0 0 0 0 | NO ERROR |
| 0 0 0 1 | 15TH BIT |
| 0 0 1 0 | 14TH BIT |
| 0 0 1 1 | 11TH BIT |
| 0 1 0 0 | 13TH BIT |
| 0 1 0 1 | 7TH BIT |
| 0 1 1 0 | 10TH BIT |
| 0 1 1 1 | 5TH BIT |
| 1 0 0 0 | 12TH BIT |
| 1 0 0 1 | 1ST BIT |
| 1 0 1 0 | 6TH BIT |
| 1 0 1 1 | 8TH BIT |
| 1 1 0 0 | 9TH BIT |
| 1 1 0 1 | 2ND BIT |
| 1 1 1 0 | 4TH BIT |
| 1 1 1 1 | 3RD BIT |

STORAGE DEVICE AND DATA PROCESSING METHOD

CROSS-REFERENCE TO RELATED APPLICATIONS

This application is based upon and claims the benefit of priority from the prior Japanese Patent Application No. 2013-172500, filed on Aug. 22, 2013; the entire contents of which are incorporated herein by reference.

FIELD

This embodiment generally relates to a storage device and a data processing method.

BACKGROUND

In recent years, there have been more cases where a plurality of information processing devices each having a storage device is mutually connected via a network to operate as one information processing system (for example, cloud computing). As for a storage device, in some cases, a number of DRAM chips or NAND flash chips are arrayed and connected via wires between the chips, so that the chips are used as one storage device that operates at higher speed than a conventional storage device utilizing HDD.

In the single information processing system formed by connecting the plural information processing devices, the performance of the information processing system is increased by increasing the number of the information processing devices included in the information processing system. In a large-scaled information processing system including a large number of information processing devices, however, problems occur in that the expected performance is not achieved, the time and effort and cost for managing the system increase, and so on.

As a solution to the problems, a storage device has been suggested in which a plurality of memory nodes with a data transfer function is connected to each other. In such a storage device, each memory node performs, upon the reception of a packet addressed thereto, a predetermined process, for example, reads out the data from the packet or writes the data in the packet and upon the reception of a packet not addressed thereto, the transfer of the data to another appropriate memory node. By repeating the appropriate transfer among the memory nodes, the packet can reach the target memory node. This configuration is advantageous in that the design is facilitated even though the storage device is increased in size.

BRIEF DESCRIPTION OF THE DRAWINGS

FIG. 22 is a diagram depicting the relation between syndrome and a position of an error bit;

DETAILED DESCRIPTION

A storage device according to an embodiment includes a plurality of memory nodes and a first connection unit. Each memory node includes nonvolatile memory and is connected to each other in two or more different directions. The first connection unit is configured to transmit an externally supplied command to a first memory node to which the first connection unit is connected among the plural memory nodes. The first connection unit adds a first lifetime to the command, and transmits the command including the first lifetime to the first memory node. A second memory node having received the command including the first lifetime among the plural memory nodes, if the second memory node is not the memory node to which the command is addressed, subtracts the first lifetime added to the first command. The second memory node discards the command including the first lifetime after the subtraction when the first lifetime after the subtraction is less than a threshold. The second memory node transfers the command including the first lifetime after the subtraction to the adjacent memory node when the first lifetime after the subtraction is larger than the threshold.

A storage device and a data processing method according to embodiments are hereinafter described in detail with reference to the attached drawings. Note that the present invention is not limited to these embodiments.

(First Embodiment)

Figure 1:
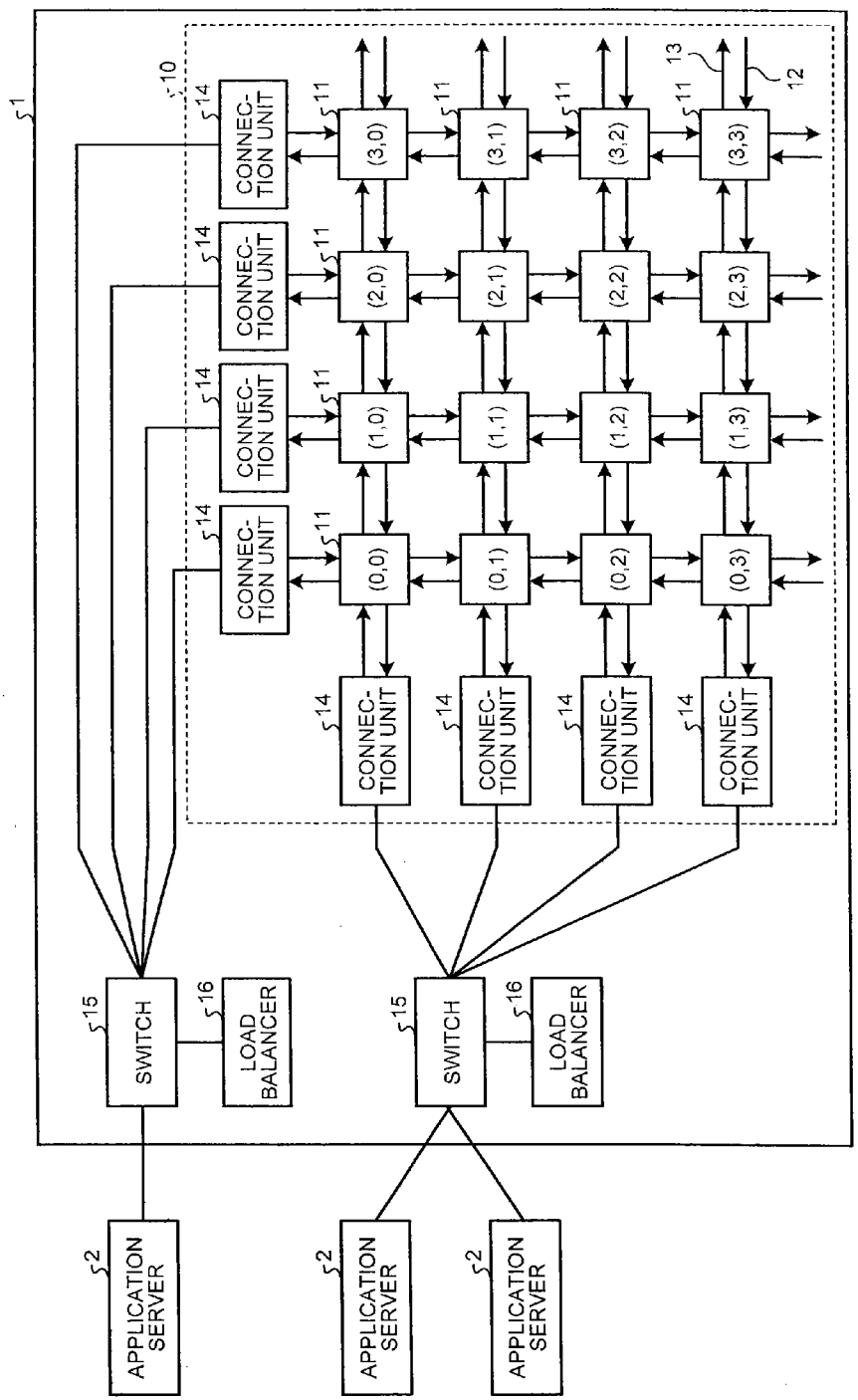
FIG. 1 depicts a configuration example of a storage device according to a first embodiment.

FIG. 1 depicts a configuration example of a storage device according to a first embodiment. A storage device 1 is connected to one or more application servers 2. The application server 2 is connected to a client terminal (not illustrated) via a network. The application server 2 can receive the request to the storage device 1 via the network. The application server 2 transfers the request received from the client terminal to the storage device 1. The request includes, for example, a request for writing in or reading out the data. As depicted in FIG. 1, the storage device 1 can have a plurality of independent switches 15 and load balancers 16. The increase in performance of the switch 15 and the load balancer 16 along with the increase in scale of the storage device is not necessary; thus, this configuration is suitable for scale out.

The storage device 1 includes a storage unit 10, the switches 15, and the load balancers 16. The storage unit 10 has a structure in which a plurality of memory nodes 11 having functions of storing and transferring data is connected to each other. The data transfer function is based on a transfer method in which each memory node 11 transfers the packet efficiently.

In FIG. 1, the data are dispersedly stored in the memory nodes 11 in the storage unit 10. In the example of FIG. 1, the memory nodes 11 are disposed on lattice points in a rectangular lattice. The coordinates of the lattice points are represented by the coordinate (x, y) and the positional information of the memory node 11 disposed on the lattice point is represented by the node address $(x_D, y_D)$ in association with the coordinate of the lattice point. In the example of FIG. 1, the memory node 11 in the upper left corner has the node address (0, 0) of the origin, and the node address of the memory node 11 increases or decreases by an integer when the memory node 11 moves in a horizontal direction (X direction) and a vertical direction (Y direction).

Each memory node 11 includes two or more input ports 12 and two or more output ports 13. Each memory node 11 is connected to the adjacent memory node 11 via the input port 12 and the output port 13. More specifically, the two adjacent memory nodes 11 that face each other are connected to each other via their mutual input port 12 and output port 13.

Each memory node 11 is connected to the memory nodes 11 that are adjacent thereto in two or more different directions. For example, the memory node 11 in the upper left corner in FIG. 1, which is represented by the node address (0, 0), is connected to the memory node 11 adjacent thereto in the X direction, which is represented by the node address (1, 0), and the memory node 11 adjacent thereto in the Y direction different from the X direction, which is represented by the node address (0, 1). Further, in FIG. 1, the memory node 11 represented by the node address (1, 1) is connected to the four memory nodes 11 adjacent in the different four directions, which are represented by the node addresses (1, 0), (0, 1), (2, 1), and (1, 2). The memory node 11 represented by the node address $(x_D, y_D)$ may hereinafter be referred to as the memory node $(x_D, y_D)$. The input port 12 and the output port 13 may be collectively referred to as the input/output ports 12 and 13.

The storage unit 10 includes at least one connection unit 14. The connection unit 14 is connected to the memory node 11 via the input port 12 and the output port 13. If the communication standard between the memory nodes 11 and the communication standard of the connection unit 14 are different, an adapter may be provided between the both. In the example of FIG. 1, the connection units 14 are connected to x-directional and y-directional ends of the two-dimensional square lattice where the memory nodes 11 are disposed; however, the present invention is not limited thereto.

The request input from the application server 2 is input to the load balancer 16 via the switch 15. The load balancer 16 examines the state of each connection unit 14, and selects the connection unit 14 that is not busy in a process. The load balancer 16 manipulates the switch 15 to transfer the request to the selected connection unit 14. In this embodiment, there are two components: the switch 15 and the load balancer 16; however, the load balancer 16 may be omitted by having the switch 15 fulfil the function of the load balancer 16.

The connection unit 14 generates the packet that can be transferred or executed by the memory node 11, and transmits the generated packet to the memory node 11 that is connected to the own connection unit 14.

The packet is transferred among the memory nodes 11 and reaches the target memory node 11 in a manner that the memory node 11 having received the packet decides a routing destination on the basis of a predetermined transfer algorithm (explained later). The routing destination means one memory node 11 among a plurality of memory nodes 11 which are connected to the memory node 11 having received the packet. The memory node 11 can decide the routing destination avoiding the memory node with the trouble or the congestion on the basis of the transfer algorithm. Here, if the trouble of the memory nodes 11 occurs in a particular shape, the packet circulates along the same memory nodes 11 and the process for the packet never ends. The time after the connection unit 14 transmits the packet and before the connection unit 14 receives the response is increased along with the increase in the total number of packets in transmission or in process within the storage unit 10. This is because the increase in number of packets results in congestion and prevents the packet transfer. If the packet circulates along the same memory nodes 11 and does not reach the memory node 11 of a packet destination, the number of packets remaining in the storage unit 10 increases, resulting in that the throughput of the entire storage device 1 is deteriorated. The packet destination means a memory node 11 which is a final destination of the packet. According to the first embodiment, the lifetime reducing along with the transfer is recorded in the packet and if the lifetime has become a predetermined value or less, the packet is discarded.

Figures 2, 3:
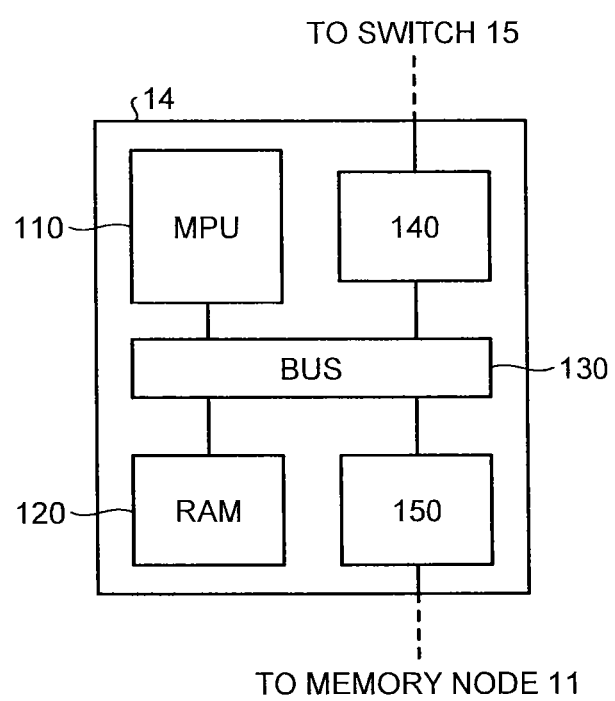
FIG. 2 is a diagram for explaining a configuration of a packet according to a first embodiment.
FIG. 3 is a diagram depicting an example of a configuration of a connection unit.

FIG. 2 is a diagram for explaining the configuration of the packet according to the first embodiment. The packet is configured to include a node address of a packet destination, a node address of a packet source, a lifetime, and a command (instruction). In other words, the lifetime is added to the command. The packet source means a connection unit 14 or a memory node 11 which has generated the packet.

The lifetime is calculated by the connection unit 14 and recorded in the packet. The lifetime is calculated based on the number of times of transfers along the minimum route from the connection unit 14 that has generated the packet to the memory node 11 to which the packet is addressed. For example, the lifetime is a positive integer obtained by multiplying the number of times of transfers in the minimum route by a predetermined constant. If the lifetime has become a predetermined value (here "0") or less during the transfer among the memory nodes 11, the packet is discarded by the memory node 11. This can prevent that the packet with the short minimum route remains in the storage unit 10 for an extra time or that the packet with the long minimum distance cannot avoid the memory node 11 with a trouble.

Here, as an example, the lifetime is calculated based on the number of times of transfers; however, the present invention is not limited thereto. For example, a user (human) can set a variable defined as the lifetime. In this method, the load of operation can be reduced further because the calculation of the lifetime can be omitted.

The connection unit 14 may have as a fixed value, a calculation value based on the number of times of transfers in the minimum route from the connection unit 14 to the farthest memory node 11, and may add the fixed value as the lifetime to the packet. It is assumed that the calculation value based on the number of times of transfers is calculated at a timing when, for example, the initialization is performed or a new memory node 11 is added. The use of the fixed value as the lifetime omits the process of calculating the lifetime on the basis of the address in the packet every time the connection unit 14 receives the packet 14, and thus the calculation load of the connection unit 14 is reduced.

The packet is generated in response to the request received from the application server 2. For example, in the case where the requested data are divided into plural pieces and the divided pieces of data are dispersedly stored in the memory nodes 11, the connection unit 14 specifies all the memory nodes 11 to which the divided pieces of data are stored, and generates for every specified memory node 11, the packets to read out the divided pieces of data from all the specified memory nodes 11. For example, the connection unit 14 records the node address of the specified memory node 11 in the packet as the node address to which the packet is addressed, and records the node address of the memory node 11 to which the connection unit 14 is connected and the packet is transferred first, in the packet as the node address of the packet source. The connection unit 14 records the command for reading out the divided pieces of data in the packet.

FIG. 3 depicts an example of a configuration of the connection unit 14. The connection unit 14 includes a microprocessor (MPU) 110 corresponding to a processor for processing data, random access memory (RAM) 120 functioning as a main memory, a first interface device 140, and a second interface device 150. The first interface device 140 is to communicate with the switch 15. The second interface device 150 is to communicate with the memory node 11. The MPU 110, the RAM 120, the first interface device 140, and the second interface device 150 are connected to each other via a BUS 130. Here, the number of each of the first interface device 140 and the second interface device 150 may be plural. In addition, nonvolatile memory different from the RAM 120 may be included.

As the MPU 110, for example, A9 processor made by ARM Ltd., Core i7 made by Intel Corporation, or the like can be used. In this case, AMBA BUS, QPI (Quick Path Interconnect) BUS, or the like is used as the BUS 130 in accordance with the MPU 110. As the RAM 120, for example, volatile memory such as DRAM is applicable. As the RAM 120, alternatively, MRAM, PcRAM, or RRAM (registered trademark) is applicable. As the first interface device 140 corresponding to a network communication unit for performing communication with an external network, for example, a network interface such as Ethernet (registered trademark), InfiniBand, or Fiber Channel is applicable. As the first interface device 140, an external BUS such as PCI Express, Universal serial bus, or Serial attached SCSI, a storage interface, or the like is applicable. The second interface device 150 is to allow the MPU 110 to communicate with the memory node 11 via the BUS 130.

Figure 4:
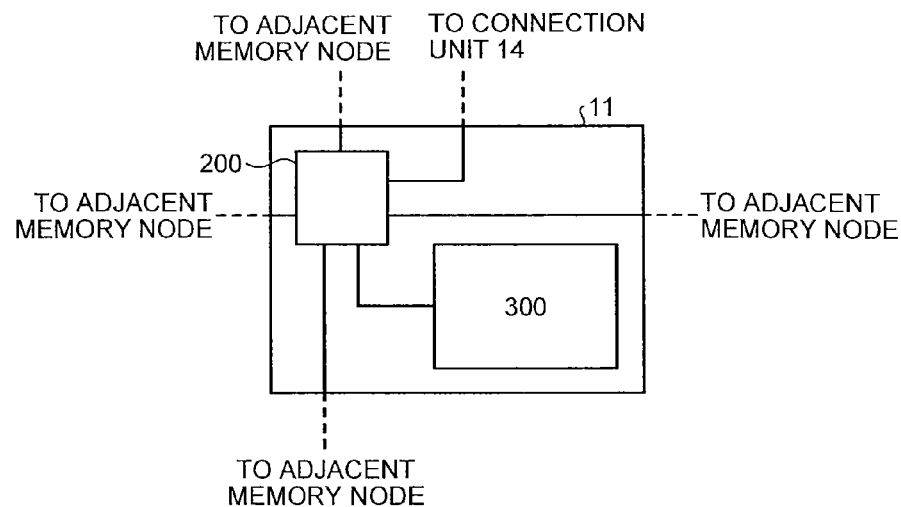
FIG. 4 is a diagram depicting an example of a configuration of a memory node.

FIG. 4 depicts an example of a configuration of the memory node 11. The memory node 11 includes a controller 200 and nonvolatile memory 300. The nonvolatile memory 300 constitutes storage. As the nonvolatile memory 300 constituting storage, NAND flash memory, a bit-cost scalable memory (BiCS), magnetoresistive random access memory (MRAM), phase change memory (PcRAM), resistive random access memory (RRAM (registered trademark)), or the like is applicable.

Figure 5:
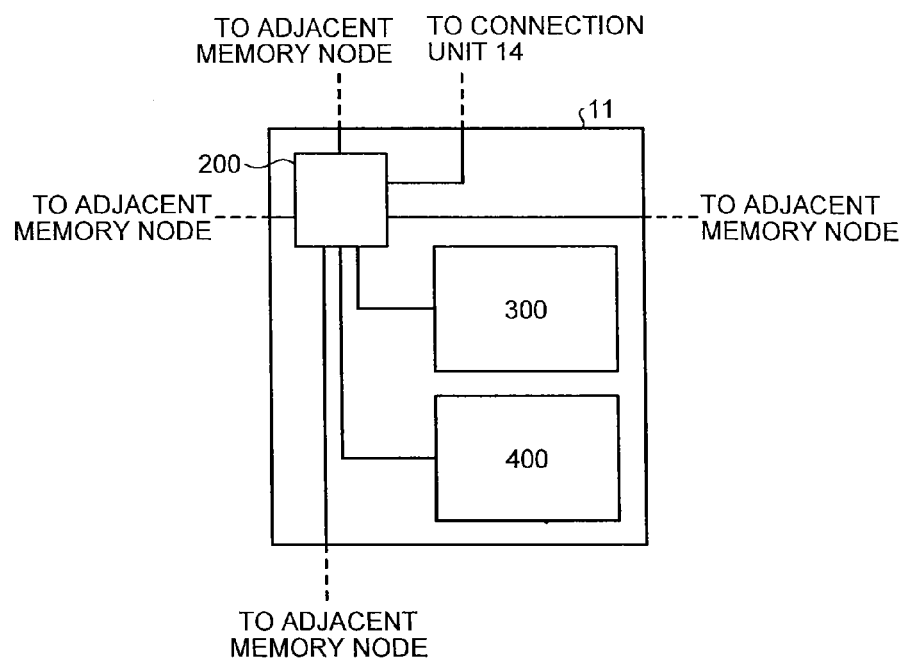
FIG. 5 is a diagram depicting another example of a configuration of the memory node.

FIG. 5 depicts another example of the configuration of the memory node 11. In this example, the memory node 11 additionally includes RAM 400 as a memory providing temporary storage. The RAM 400 is preferably a memory superior to the nonvolatile memory 300 in speed, random accessibility, and number of rewritable times. As the RAM 400, for example, DRAM, MRAM, PcRAM, RRAM (registered trademark), or the like is applicable.

The RAM 400 stores, for example, data called meta-information that is frequently read out or written. Examples of the meta-information include a table information for, if a logical address mapped in a storage region of the individual memory node 11 and a physical address in the nonvolatile memory 300 or the RAM 400 are different from each other, translating the mutual addresses. As another example of the meta-information, the attribute information related to the data recorded in the nonvolatile memory 300 or the RAM 400 is given. Although FIG. 4 and FIG. 5 depict four interfaces for the adjacent memory nodes, the present invention is not limited thereto.

Figure 6:
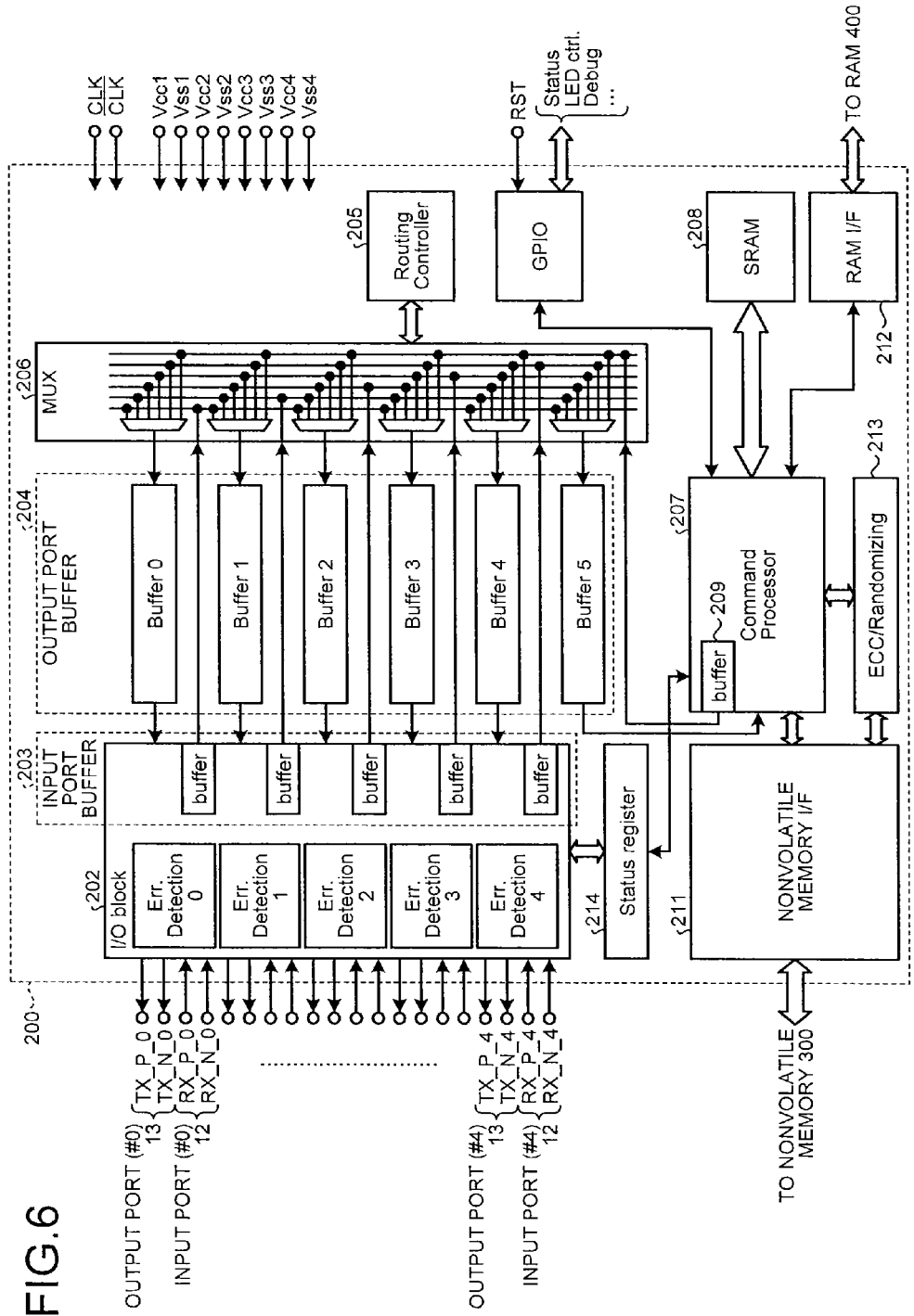
FIG. 6 is a diagram depicting an example of a configuration of a controller.

FIG. 6 depicts an example of a configuration of the controller 200. The controller 200 includes five input ports 12 to which port No. of No. 0 to No. 4 are assigned, five output ports 13 to which port No. of No. 0 to No. 4 are assigned, an I/O block 202, an input port buffer 203, and an output port buffer 204. The No. 0 input/output ports 12 and 13 are used for data communication with the connection unit 14. The No. 1 to No. 4 input/output ports 12 and 13 are used for data communication with the adjacent memory nodes 11. Here, the number of the input ports 12 and output ports 13 are five; however, the number thereof is not limited to five.

Upon the input of the packet from the input port 12, the packet is temporarily stored in the input port buffer 203. A routing controller 205 decides the routing destination of the packet on the basis of: the node address of the packet destination and the node address of the packet source that are recorded in the packet; the node address of that memory node 11; and whether the memory node 11 at the connection destination has a trouble or is congested or not. Then, the routing controller 205 subtracts the lifetime, and then transfers the packet to the appropriate output port buffer 204 by switching a multiplexer (MUX) 206. If the lifetime has become the predetermined value or less after the manipulation of the lifetime, the routing controller 205 deletes the packet without transferring the packet, for example.

If the input packet is the packet addressed to the own memory node, the packet is transmitted to the command processor 207. The command processor 207 performs the process according to the packet, such as the reading and writing relative to SRAM 208, the reading and writing relative to the nonvolatile memory 300 via nonvolatile memory I/F 211, or the reading and writing relative to the RAM 400 via a RAM I/F 212. For example, if the packet is the command for reading out the data, the command processor 207 reads out the data from the nonvolatile memory 300 or the RAM 400, generates the new packet including the read data, and transmits the generated packet to the output port buffer 204.

Inside the I/O block 202, an error detection circuit is provided relative to each pair of input/output ports 12 and 13. The error detection circuit transmits the error information to the adjacent memory node 11 in the occurrence of abnormality in the middle of data exchange, and in the occurrence of abnormality in the controller 200, the nonvolatile memory 300, the RAM 400, or the like. Thus, the error can be detected before the data are transferred to the adjacent memory node 11, thereby preventing the data exchange with the memory node with abnormality. The command processor 207 can recognize the error information via a status register.

For example, a state with no signal received is detected as an error. For example, the RAM I/F 212 may be omitted in the controller 200.

When data are written in the nonvolatile memory 300, an ECC/randomizing unit 213 randomizes the data to be written or adds an ECC code to the data to be written.

With reference to FIG. 1, the transfer algorithm is explained. Specifically, the explanation is made of the case in which the connection unit 14 connected to the memory node (0, 0) transmits the packet to the memory node (2, 2). Intrinsically, the routing controller 205 of the memory node 11 determines the route so that the packet is transferred along the minimum route from a start point, the memory node (0, 0), to the target point, the memory node (2, 2). The minimum route corresponds to the route where the number of times of transfers is the minimum. For example, the route where the packet is transferred along the memory nodes 11 with the node addresses (0, 0), (1, 0), (1, 1), (1, 2), and (2, 2) in this order corresponds to the minimum route herein described.

For example, it is assumed that the packet cannot be transferred from the memory node (1, 0) to the memory node (1, 1) because the memory node (1, 1) has a trouble or is congested. In this case, the memory node (1, 0) selects the memory node (2, 0) as the routing destination with the lower priority than the memory node (1, 1) that is included in the aforementioned minimum route. Thus, the route is determined so that the packet is transferred from the memory node (1, 0) to the target point via the memory node (2, 1). Each memory node 11 can recognize from the error detection circuit provided for the I/O block 202 whether the connected memory node 11 has a trouble or not. The error detection circuit may either detect the error at the data transfer or detect the error by receiving an error signal from the adjacent node. Each memory node 11 can recognize whether the output port is congested or not. For example, whether the memory node 11 as the connection destination is congested or not may be recognized by determining whether the packet that is not transmitted remains in the output port 204 or not, or by receiving a busy signal from the adjacent node.

Note that if the plural memory nodes 11 exist in the minimum route among the memory nodes 11 as the connection destination, which one of the memory nodes 11 included in the minimum route is set to the top priority is arbitrarily selected. Further, the priority order of third and subsequent orders may be set.

Next, the operation of the storage device 1 according to the first embodiment is explained.

Figure 7:
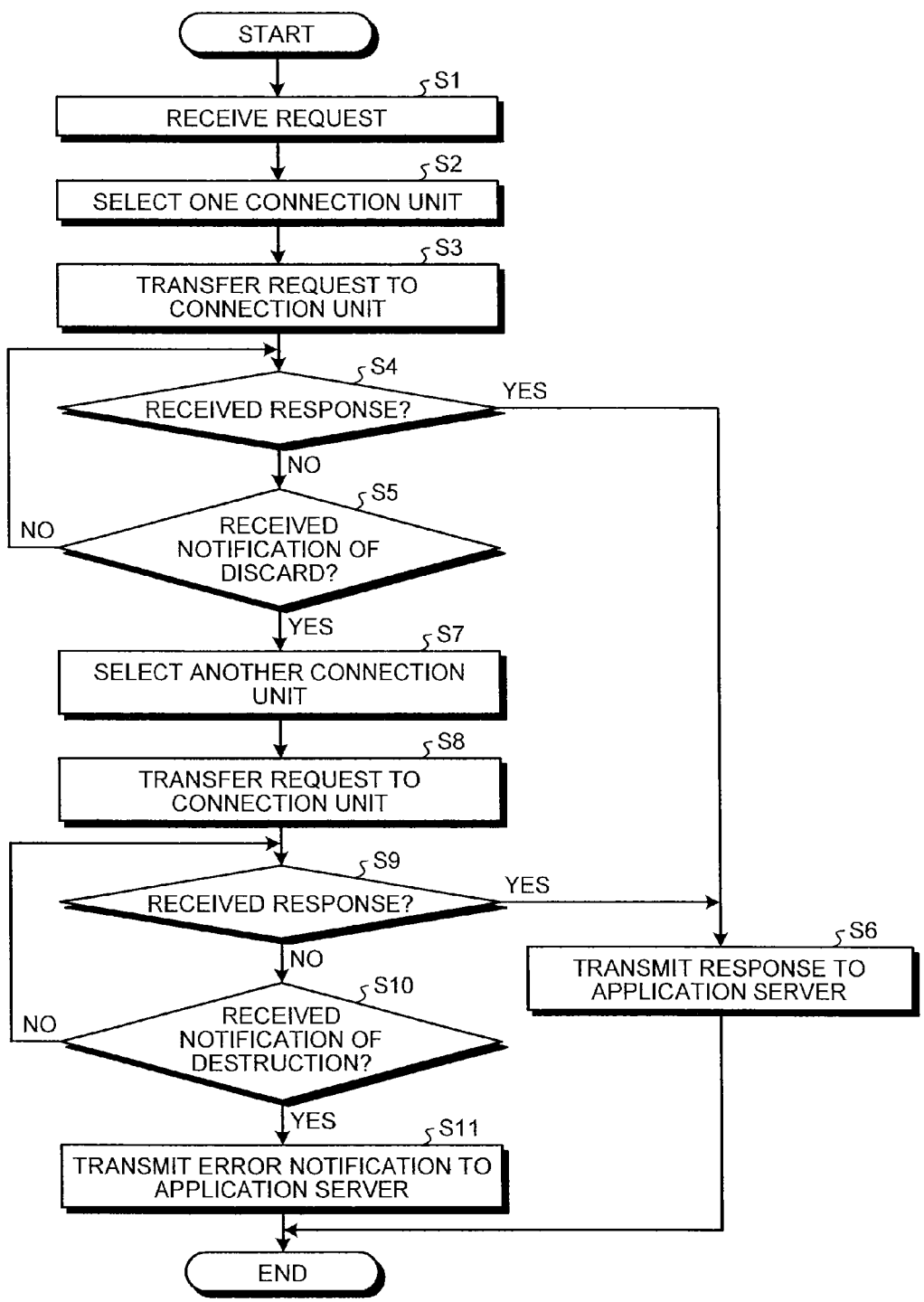
FIG. 7 is a flowchart for explaining an operation of a load balancer according to the first embodiment.

FIG. 7 is a flowchart for explaining the operation of the load balancer 16 according to the first embodiment. Upon the reception of the request from the application server 2 (S1), the load balancer 16 selects one connection unit 14 that is not busy in the process from among the connection units 14 included in the storage unit 10 (S2). Then, the load balancer 16 transfers the request to the connection unit 14 selected by the process in Step S2 (S3). After transmitting the request, the load balancer 16 waits for the response to the request or the notification of discard, which is explained later. The load balancer 16 determines whether the response has been received from the connection unit 14 (S4). If the response has not been received (No in S4), the load balancer 16 determines whether the notification of discard has been received or not (S5). If the notification of discard has not been received (No in S5), the balancer 16 executes the determination process of Step S4 again. If the response has been received (Yes in S4), the load balancer 16 transmits the response to the application server 2 (S6), and ends the operation.

Upon the reception of the notification of discard from the connection unit 14 (Yes in S5), the load balancer 16 selects one connection unit 14 different from the connection unit 14 selected in Step S2 (S7). Then, the load balancer 16 transfers the request to the connection unit 14 selected by the process of Step S7 (S8). After transmitting the request, the load balancer 16 determines whether the response has been received from the connection unit 14 (S9). If the response has not been received (No in S9), the load balancer 16 determines whether the notification of discard has been received or not (S10). If the notification of discard has not been received (No in S10), the load balancer 16 executes the determination process of Step S9 again. If the response has been received (Yes in S9), the process of Step S6 is executed and the operation ends.

If the notification of discard has been received again (Yes in S10), the load balancer 16 transmits the error notification to the application server 2 (S11), and the operation ends.

Figure 8:
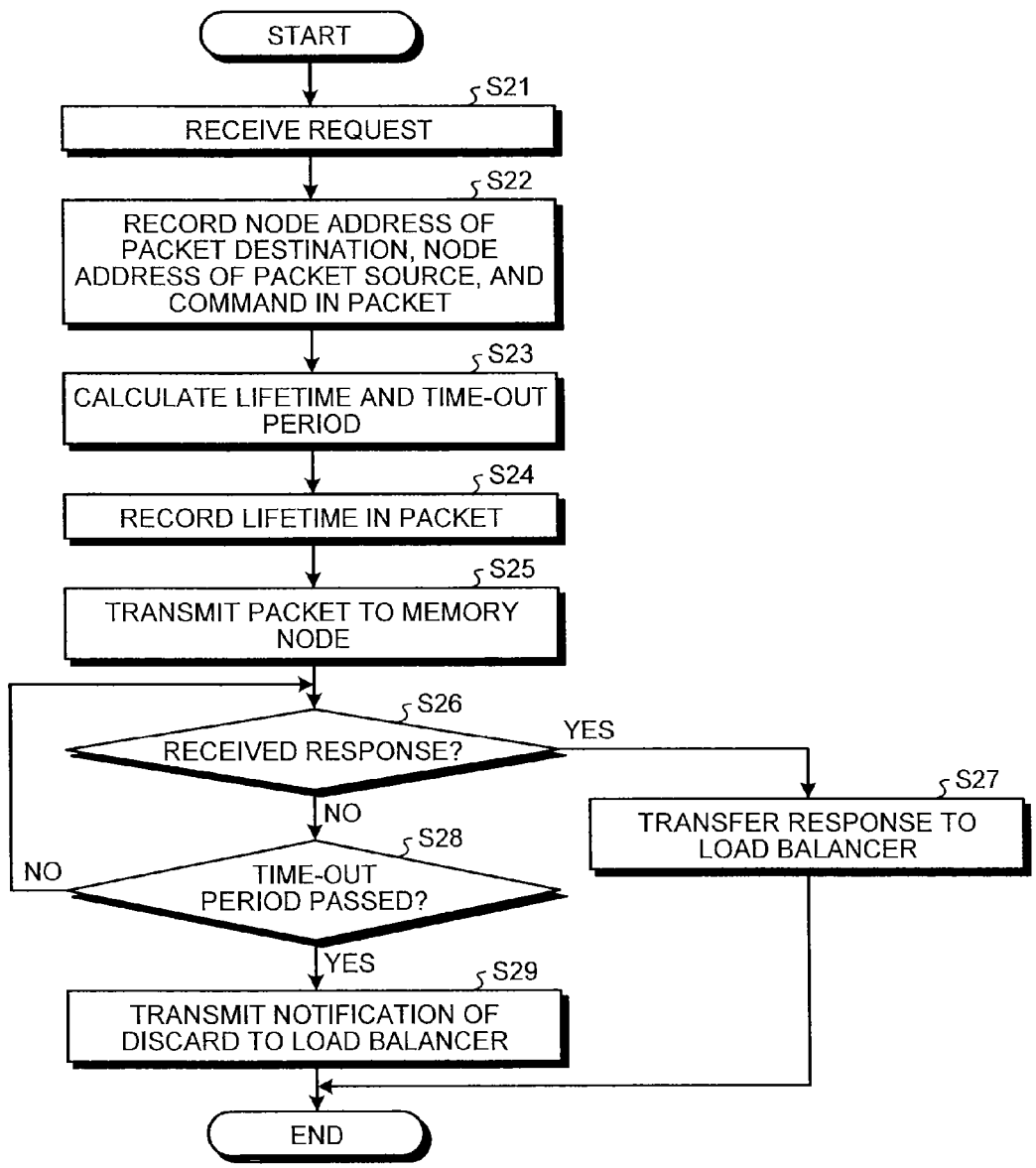
FIG. 8 is a flowchart for explaining an operation of a connection unit according to the first embodiment.

FIG. 8 is a flowchart for explaining the operation of the connection unit 14 according to the first embodiment. Upon the reception of the request at the first interface device 140 in the connection unit 14 (S21), the MPU 110 generates the node address of the packet destination, the node address of the packet source, and the command in the packet in response to the received request, and records these pieces of information in the packet (S22). The MPU 110 calculates the lifetime and the time-out period based on a certain calculation value (S23). The certain calculation value corresponds to, for example, the number of times of transfers along the minimum route from the memory node 11 of the packet destination to the own connection unit 14. Then, the MPU 110 records the calculated lifetime in the packet (S24).

Subsequently, the MPU 110 transmits the packet to the memory node 11 connected to the second interface device 150 (S25). The MPU 110 keeps waiting for the response from the memory node 11 at the destination after transmitting the packet and before the calculated time-out period has passed. The MPU 110 determines whether the response has been received or not (S26). If the response has been received (Yes in S26), the MPU 110 transfers the received response to the load balancer 16 (S27) and the operation of the connection unit 14 ends. If the response has not been received (No in S26), the MPU 110 determines whether the time-out period has passed after the transmission of the packet (S28). If the time-out period has not passed (No in S28), the MPU 110 executes the process of Step S26 again. If the time-out period has passed (Yes in S28), the MPU 110 transmits the notification of discard to the load balancer 16 as the time-out process (S29). Then, the operation of the connection unit 14 ends.

Although the notification of discard is transmitted to the load balancer 16 when the time-out period has passed, the notification of discard may be transmitted upon the reception of the packet having run out of the lifetime, as explained later. Moreover, although the request is received via the load balancer 16, the request may be output from the application server 2 or the client to the connection unit 14 directly. Further, when the request is received via the load balancer 16, the response thereto may be sent back to the application server 2 or the client directly.

Figure 9:
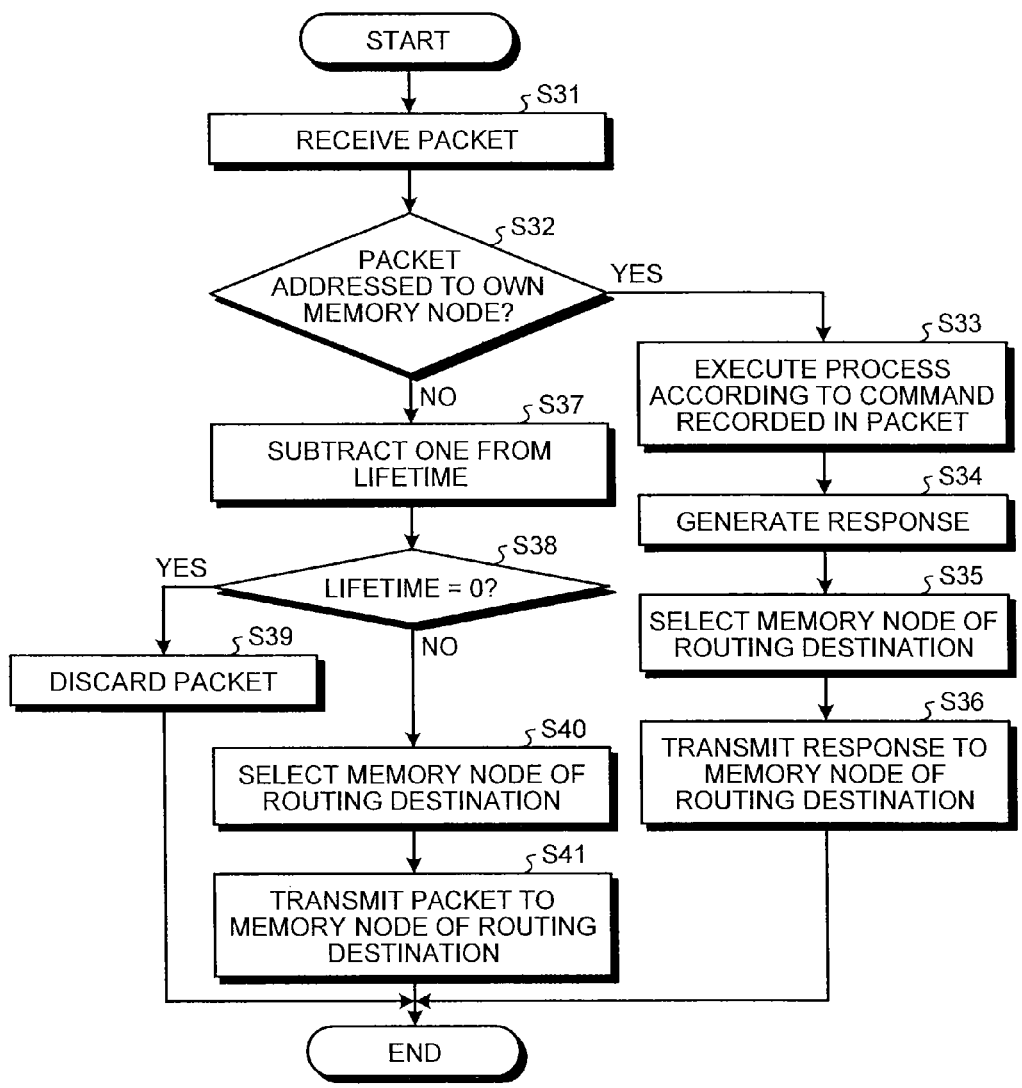
FIG. 9 is a flowchart for explaining an operation of the memory node according to the first embodiment.

FIG. 9 is a flowchart for explaining the operation of the memory node 11 according to the first embodiment. Upon the reception of the packet at the input port 12 in the memory node 11 (S31), the routing controller 205 determines whether the packet is addressed to the own memory node 11 or not by comparing the node address of the packet destination recorded in the packet and the node address of the own memory node 11 (S32). If the packet is addressed to the own memory node 11 (Yes in S32), the routing controller 205 transmits the packet to the command processor 207 and the command processor executes the process according to the command recorded in the received packet (S33). The command processor 207 generates the response after completing the process (S34). The generated response is stored temporarily in a buffer 209 in the command processor 207.

The response may have a configuration similar to the packet described with reference to FIG. 2. For example, if the command is the read command, the command processor 207 reads out the data from the nonvolatile memory 300. The command processor 207 records the read data in the response instead of the command. If the command is the write command, the command processor 207 writes the data in the nonvolatile memory 300 and records the writing completion notification in the response instead of the command. The command processor 207 moreover records the node address of the packet destination recorded in the input packet (i.e., the node address of the own memory node 11) as the node address of the packet source in the response, and records the node address of the packet source recorded in the input packet as the node address of the packet destination in the response. Note that the command processor 207 may or may not record the lifetime in the response. The lifetime recorded in the response is calculated by, for example, a process similar to the process of Step S23 by the command processor 207. Here, the data are stored in the nonvolatile memory 300; however, the data may be stored in the SRAM 208 or the RAM 400.

The routing controller 205 selects the memory node 11 of the routing destination according to the transfer algorithm (S35). Then, the routing controller 205 transmits the response stored in the buffer 209 to the selected memory node 11 of the routing destination (S36).

If the packet is not addressed to the own memory node 11 (No in S32), the routing controller 205 subtracts one from the lifetime set in the packet (S37). Then, the routing controller 205 determines whether the lifetime is equal to "0" or not (S38). If the lifetime is equal to "0" (Yes in S38), the routing controller 205 discards the packet (S39) and thus the operation of the memory node 11 ends. If the lifetime is not equal to "0" (No in S38), the routing controller 205 selects the memory node 11 of a routing destination according to the transfer algorithm (S40). Then, the routing controller 205 transmits the packet to the selected memory node 11 of the routing destination (S41), and the operation of the memory node 11 ends.

Figure 10:
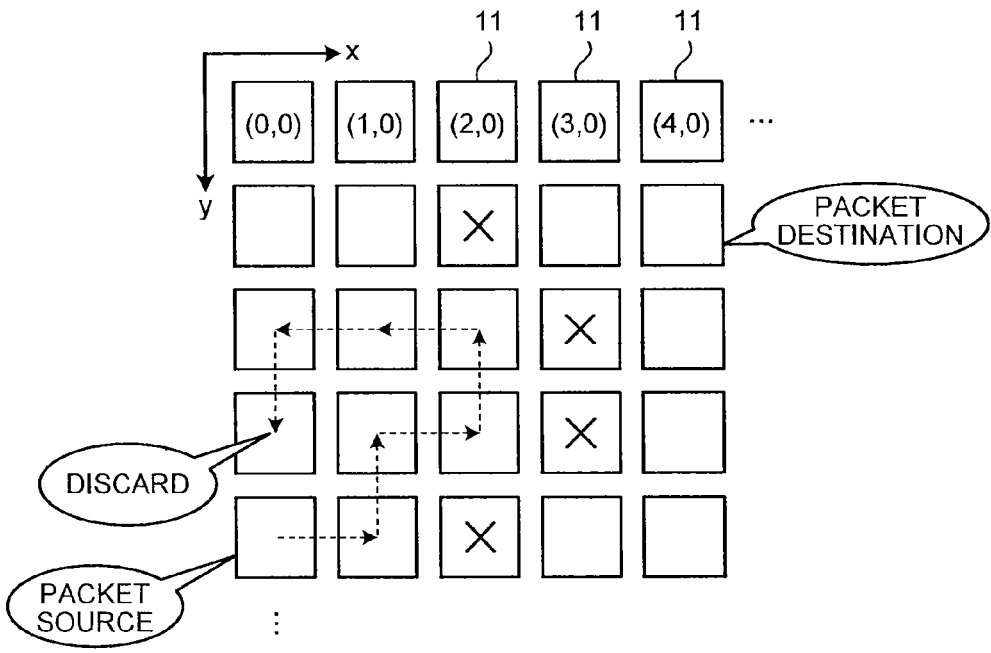
FIG. 10 is a diagram for explaining an example of a route of the packet.

FIG. 10 depicts an example of the route of the packet transferred based on the operation as above. The explanation is made of the packet transmitted from the memory node (0, 4) to the memory node (4, 1). In the case of the transfer along the minimum route, the packet reaches the memory node (4, 1) through seven transfers. It is assumed that the lifetime of this packet is set to, for example, "7". Here, the memory nodes (2, 1), (2, 4), (3, 2) and (3, 3) have a trouble. For avoiding these memory nodes 11, the packet is routed as indicated by a dotted arrow, for example. This packet has a lifetime of "0" at the memory node (0, 3) after seven transfers, and is then discarded. Here, the packet is discarded when the lifetime has ended; additionally, the memory node 11 having discarded the packet may notify the end of the lifetime. As a method of the notification, the memory node 11 having discarded the packet may generate the packet notifying the end of the lifetime or may notify the end via a dedicated communication route. In the latter case, each memory node 11 has a dedicated communication route, and the memory node 11 is directly connected to the connection unit 14 via the dedicated communication route. The dedicated communication route may be used as the route for notifying the error information, such as the trouble of the memory node or the failure of the packet transmission, or the route for notifying the internal information of the memory node. This can relieve the congestion because the number of packets in the memory nodes is not increased.

Note that the amount of lifetime to be subtracted per transfer is "1" in the above description; however, the amount may be increased according to the increase in time necessary for the transfer. The amount of lifetime to be subtracted per transfer may be calculated by the command processor 207 or the routing controller 205 in the individual memory node 11. Further, the amount may be subtracted when a predetermined period of time has elapsed. In addition, the lifetime is not limited to an integer.

Although FIG. 1 depicts the memory nodes disposed at the lattice points of a rectangular lattice, the arrangement of the memory nodes is not limited thereto. In other words, the shape of the lattice may be, for example, a triangle, a hexagon, or the like as long as the memory node at each lattice point is connected to the memory nodes in two or more different directions. Although FIG. 1 depicts the memory nodes arranged two-dimensionally, the memory nodes may be disposed three-dimensionally by disposing two more input ports 12 and two more output ports 13 in the controller. In the case where the memory nodes are arranged three-dimensionally, the position of the memory node is specified by three values of (x, y, z).

Figure 11:
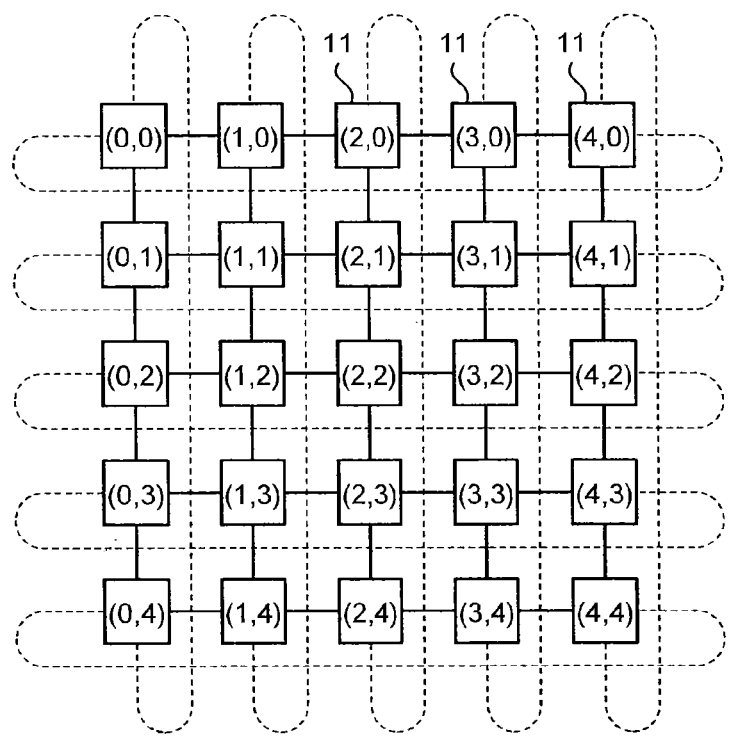
FIG. 11 is a diagram depicting an example in which memory nodes are connected in a torus shape.

In the case where the memory nodes are arranged two-dimensionally, the memory nodes 11 disposed at opposite sides may be connected to each other in the torus shape. In the example depicted in FIG. 11, the memory nodes 11 are connected to each other along a route illustrated with a solid line and a route illustrated with a dotted line. The route illustrated with the solid line and the route illustrated with the dotted line are equivalent to each other. In this case, routing can be performed in plural directions depending on whether the routing is performed in a direction where the X-coordinate value of the node address increases or decreases, and/or the routing is performed in a direction where the Y-coordinate value of the node address increases or decreases. For example, in the case where the packet addressed from the memory node (2, 0) to the memory node (2, 3) is routed in a direction where the Y-coordinate value increases, for example, the packet is transferred among the memory nodes 11 in the order of the memory nodes with the node addresses (2, 0), (2, 1), (2, 2), and (2, 3). In the case where this packet is routed in a direction where the Y-coordinate value decreases, for example, the packet is transferred among the memory nodes 11 in the order of the memory nodes with the node addresses (2, 0), (2, 4), and (2, 3). The connection unit 14 may decide the routing direction starting from the memory node 11 connected to the own connection unit 14, and record the decided direction in the packet. In each memory node 11, the routing controller 205 may select the output port 13 to which the memory node 11 at the routing destination is connected on the basis of the direction recorded in the packet. When the connection unit 14, after transmitting the packet in which one direction is set, has detected the passage of the time-out period in the determination process of Step S28, the connection unit 14 may transmit the packet in which a routing direction different from the transmitted routing direction is recorded. When the connection unit 14, after transmitting the packet in which the different direction is recorded, has detected the passage of the time-out period in the determination process of Step S28, the connection unit 14 may transmit the notification of discard to the application server 2.

When the load balancer 16, after transferring the request to the connection unit 14, has received the notification of discard, the load balancer 16 changes the connection unit 14 to which the packet is transferred and executes the transfer of the request again. Upon the reception of the notification of discard after the re-execution of the transfer, the load balancer 16 transmits the error notification to the application server 2; however, the number of times of re-executions of the transfer may be two or more.

According to the first embodiment, the connection unit 14 calculates the lifetime and records the calculated lifetime in the packet. Among the memory nodes 11, the memory node 11 having received the packet subtracts the lifetime recorded in the packet if the address of the packet is not the own memory node. The memory node 11 discards the packet if the lifetime after the subtraction is less than the predetermined value. If the lifetime after the subtraction is greater than the predetermined value, the memory node 11 rewrites the lifetime after the subtraction into the instruction lifetime recorded in the packet, and then transfers the packet to another memory node 11 connected to the own memory node 11. Since this can reduce the number of packets remaining in the storage unit 10, the deterioration in throughput caused by the remaining packets can be suppressed.

The memory node 11 having received the packet executes the command recorded in the packet and transmits the response to the command if the address of the packet is the own memory node. The connection unit 14 executes the time-out process if the response is not received within the time-out period after the transmission of the packet. Thus, the connection unit 14 can detect the discard of the packet.

If the routing direction can be specified and the response is not received within the time-out period after the transmission of the packet, the connection unit 14 transmits the packet after changing the routing direction. Thus, the packet is discarded less frequently. Further, the load on the load balancer 16 can be reduced.

Moreover, upon the reception of the notification of the discard, the load balancer 16 transfers the request to the connection unit that is different from the connection unit that has transmitted the notification of the discard. Thus, the non-execution of the request due to the disappearance of the packet can be made less frequent.

Based on the predetermined transfer algorithm and the state of the other memory nodes connected to the own memory node (such as the trouble state or the packet occupancy information of the input/output port), each memory node 11 selects one memory node 11 to which the packet is transferred, from among the other memory nodes connected to the own memory node. Thus, the connection unit 14 allows the packet to reach the addressed memory node without deciding the transfer route.

The lifetime may alternatively be calculated in each controller of all the memory nodes 11. For example, all the memory nodes 11 may include a lifetime calculation unit by which the lifetime is calculated in the memory node 11 having received the packet. The lifetime calculation unit calculates the minimum distance in consideration of the coordinate of the addressed memory node 11 and the coordinate of the own memory node 11, and calculates the lifetime based on the minimum distance.

(Second Embodiment)

Figure 12:
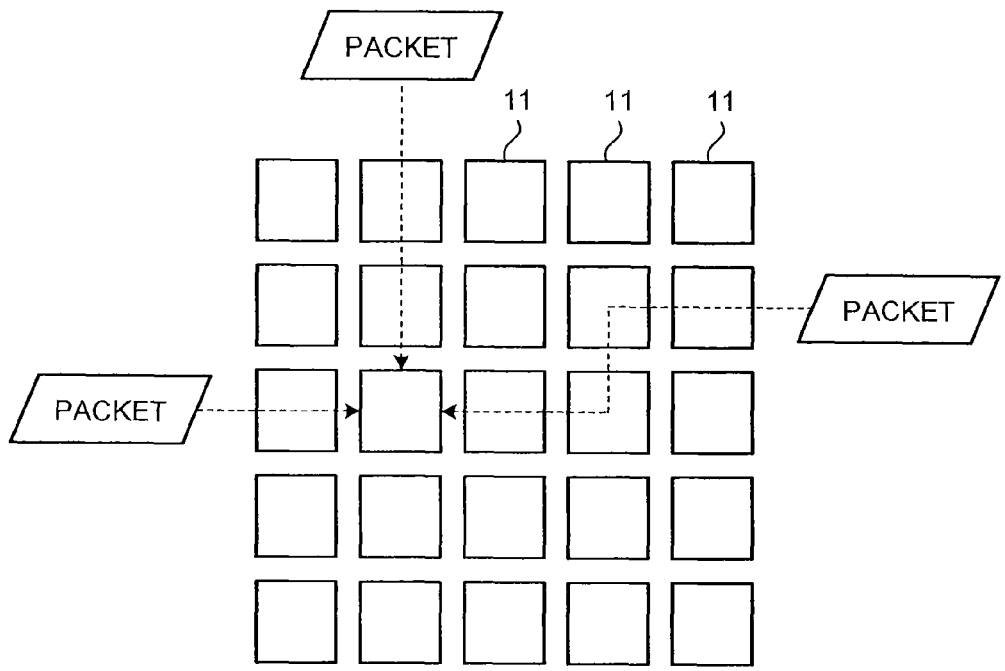
FIG. 12 is a diagram for explaining the case in which a plurality of data write requests is input to the storage device.

A second embodiment is based on the case in which a request (write request) for writing data is input to the storage device 1. FIG. 12 is for explaining the case in which a plurality of write requests is input to the storage device 1. In response to the plurality of write requests, plural different packets each having a write command are generated by one or more connection units 14. In the case of the write requests for writing data in the same location, the generated packets reach the same memory node 11. These packets are not necessarily generated by the same connection unit 14. These packets are routed separately. Therefore, these packets do not necessarily reach the memory node 11 at the packet destination in the order of the input of the write requests to the storage device 11. Depending on the order of reaching the memory node 11 at the packet destination, the data requested to be written later may overwritten with the data requested to be written before that.

In view of this, in the second embodiment, the version information according to the order of the write request is added. As an example, a time stamp is used as the version information.

Figure 13:
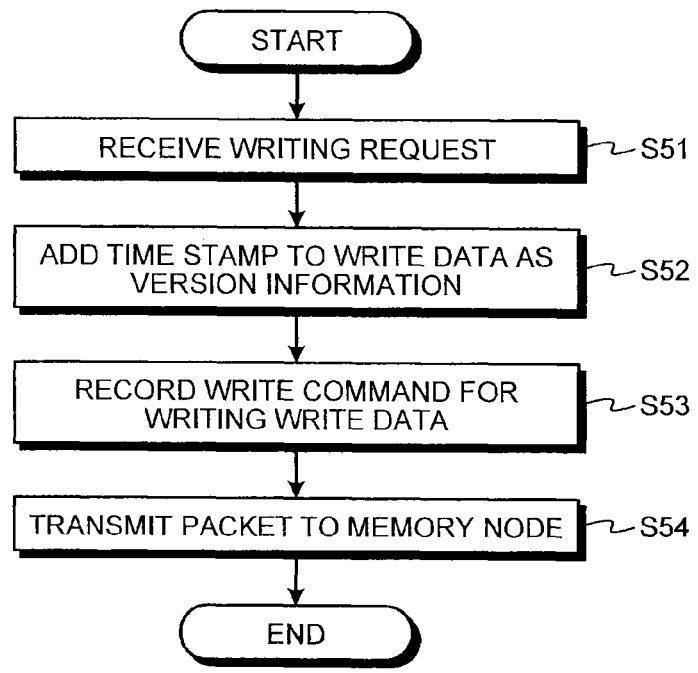
FIG. 13 is a flowchart for explaining an operation of a connection unit according to a second embodiment.

FIG. 13 is a flowchart for explaining the operation of the connection unit 14 according to the second embodiment. Upon the reception of the write request, which has been transferred from the load balancer 16, in the first interface device 14 of the connection unit 14 (S51), the MPU 110 adds the time stamp as the version information to the write data requested to be written (S52). The write data are transferred with the write request. After the addition of the version information, the MPU 110 records the write command for writing the write data in the packet (S53). Then, the MPU 110 transmits the packet to the memory node 11 connected to the second interface device 150 (S54) and thus the operation of the connection unit 14 ends.

Figure 14:
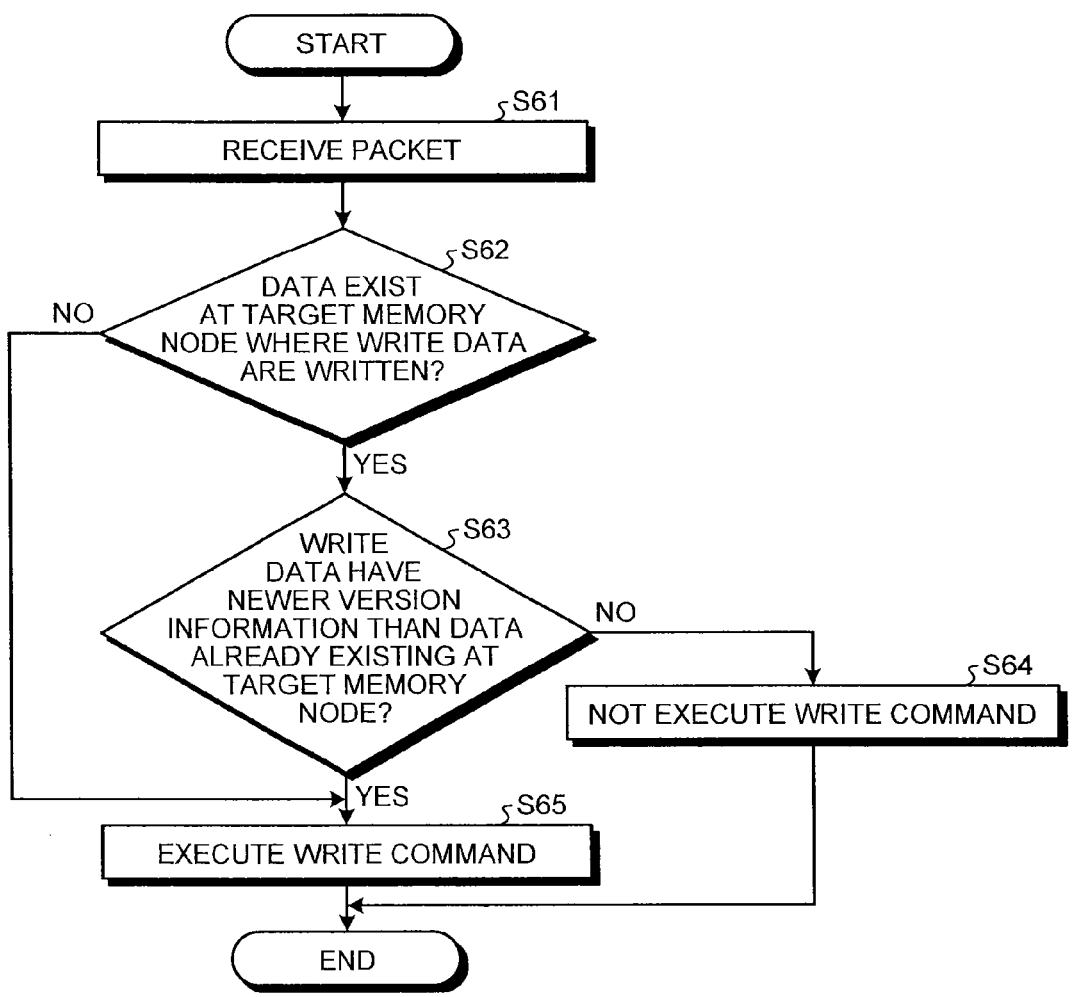
FIG. 14 is a flowchart for explaining an operation of a memory node according to a second embodiment.

FIG. 14 is a flowchart for explaining the operation of the memory node 11 according to the second embodiment. Here, the operation of the memory node 11 to which the packet generated in Step S53 is addressed is described. In other words, the description of the operation of the routing is omitted.

Upon the reception of the packet in the input port 12 in the memory node 11 to which the packet is addressed (S61), the packet is transmitted to the command processor 207 by the routing controller 205, and the command processor 207 determines whether the data are present in the storage region in which the write data are written (S62). Whether the data are present in the memory node where the write data are written can be determined by, for example, referring to table information for mutually translating the logical address mapped in the storage region in the individual memory node 11 and the physical address in the nonvolatile memory 300. In other words, the write command includes the logical address of the destination to which the write data are written. Then, the table information includes the entry for associating the logical address and the physical address for each piece of valid data written in the nonvolatile memory 300. The command processor 207 can determine whether the data are present in the destination where the write data are written, by retrieving the table information using the logical address included in the write command as a key, and determining whether the entry is extracted by the retrieval. Note that the table information is stored in the RAM 400, for example, and updated sequentially. The table information may be hereinafter referred to as an L2P table.

If the data are present at the destination to which the write data are written (Yes in S62), the command processor 207 determines whether the version information added to the write data is newer than the version information added to the data present in the target memory node (S63). If the version information of the data present in the memory node to which the write data are written is newer than that of the write data (No in S63), the command processor 207 ends the operation of the memory node 11 without executing the write command (S64).

If the data are not present in the memory node to which the write data are written (No in S62) or if the version information of the write data is newer than that of the data present in the memory node to which the write data are written (Yes in S63), the command processor 207 executes the write command (S65). In other words, the command processor 207 writes the write data in the nonvolatile memory 300. After Step S65, the operation of the memory node 11 ends.

In this manner, since the write data whose version information is newer than that of the data already present in the target memory node are written in the memory node 11, it is possible to prevent the data requested later from being overwritten with the data requested before that.

For preventing the data requested later from being overwritten with the data requested before that, a CPU may be provided for collectively managing the consistency of the write data in the vicinity of the interface of the storage device 1. In this case, if a number of write requests are input in a short time, the load on the CPU increases, resulting in that the writing performance of the entire storage device 1 deteriorates. In contrast to this, in the second embodiment, the management of the consistency of the data is executed dispersedly in the individual memory node 11; thus, the deterioration in writing performance can be reduced.

The CPU may lock the target memory node until the execution of the write request is completed; however, in this case, since the target memory node is locked for every request, the overhead is large. According to the second embodiment, since the request is accepted and transferred to the connection unit 14 before the execution of the previously input request is completed, the consistency of the data can be secured without increasing the overhead.

Further, the description has been made assuming that the comparison of the version information is made with the data already written in the nonvolatile memory 300 every time the write command is received in the memory node 11. In the case where the write data are buffered in the temporary storage region (such as the RAM 400), the command processor 207 may accumulate the write data whose target memory node is the same in the buffer and may write the write data whose version information is the newest among the accumulated write data at a predetermined timing in the nonvolatile memory 300. That is, the command processor 207 overwrites the data already stored in the target memory node with the write data whose order of write request is the last. In the case where the storage device 1 constitutes a database, for example, this configuration causes the storage device 1 to be able to execute a rollback before the data are written from the buffer to the nonvolatile memory 300. Note that the predetermined timing may be a timing of commitment in the database, for example, when a flush command issued on the establishment of the data (command for writing the data on the buffer in the memory) is received. Thus, the connection unit 14 can execute the overwriting of the data at an arbitrary timing. The flush command is transmitted from the connection unit 14 to the memory node 11 when the power is turned off, for example.

Although the time stamp is used as the version information in the above description, the version information is not limited to the time stamp. For example, every time the request is input to the storage device 1, the load balancer 6 gives a serial identification number according to the order of input of the request to the request. Then, in the connection unit 14, the serial identification number given to the request is treated as the version information. The serial identification numbers may be issued alternatively by the memory node 11 other than the memory node writing the data in the storage device 1. This can be achieved when the instruction of adding 1 to the variable on the predetermined memory is executed exclusively in the memory node 11 in charge. In this case, the serial identification numbers are assigned in the order of reach to the memory node 11 in charge. This makes it possible to perform the version management even in the circumstances where it is difficult to synchronize the time between the different connection units 14.

Thus, in the second embodiment, the connection unit 14 transmits the first data requested to be written, to the memory node 11 after adding the version information according to at least the order of the write requests to the first data. If the memory node 11 to which the first data are addressed has the second data, which are different from the first data, the memory node 11 determines whether the order of the write request of the first data is after the second data or not on the basis of the comparison of the version information. If the order of the write request of the first data is after that of the second data, the memory node 11 overwrites the second data with the first data. If the order of the write request of the first data is before that of the second data, the memory node 11 does not overwrite the second data with the first data. Thus, since the overwriting of the data requested to be written afterward with the data request to be written before that can be prevented, the consistency of the data is secured.

(Third Embodiment)

A disk array device having a plurality of hard disk devices has been known. As a technique for dispersedly storing data in such a disk array device, a technique called RAID (Redundant Array of Independent Disks) is known. In RAID, plural hard disk devices are treated as one storage device; thus, the performance and the reliability of the access process are improved.

In a third embodiment, RAID is applied to the storage device 1 (for example, RAID level 5). In other words, the storage device 1 generates parity from a predetermined volume of data, and dispersedly stores the data and the parity in the plural memory nodes 11. Here, the storage device 1 divides the data requested to be written (first data) Di (i is a natural number) into, for example, two pieces of data (second data) Dia and Dib, generates the parity (parity data) Pi on the basis of Dia and Dib, and stores Dia, Dib, and Pi to the different memory nodes 11. Note that the parity Pi may be, for example, a horizontal parity. Although the number of divisions is two here, the number thereof may be three or more. Further, a code allowing the detection or correction of a bit error may be added to the divided packets.

Now, the mapping of the addresses is explained. The write request specifies the target memory node using an address (hereinafter referred to as global address) mapped on the entire storage region in the storage device 1. Within the storage device 1, the connection unit 14 specifies the memory node 11 based on the node address, and specifies the writing position in the storage region of the specified memory node 11 using a logical address which is unique in range of the storage region. The logical address is associated with the physical position (physical address) in the storage region in each memory node 11.

Here, the correlation between the logical address and the physical address may or may not be fixed. General NAND flash memory executes the process called wear leveling. The wear leveling refers to the process of reducing the variation in number of times of writing/deleting between the blocks by uniformly dispersing the position of data writing. In the execution of the wear leveling, the correlation between the logical address and the physical address sequentially changes. The correlation between the logical address and the physical address is held in the L2P table. The L2P table is sequentially updated according to the change of the correlation. Here, each memory node 11 loads the L2P table in the RAM 400, for example, and executes the conversion between the logical address and the physical address using the L2P table loaded in the RAM 400. The L2P table further holds the correlation for every storage region with a predetermined size. The unit storage region whose correlation is recorded in the L2P table is referred to as a physical sector. In other words, the logical address corresponds to the physical address of the head of the physical sector. The physical sector may or may not be equal to the page as the unit of the read/write of the NAND flash memory. Note that the block is the unit of deletion and is constituted by plural pages. The entire L2P table may be stored in the nonvolatile memory 300 and after a part of the table is stored in the RAM 400 or the like as necessary, the logical address may be translated into the physical address. As for the node address of the memory node 11, the logical address and the physical address may be set and the correlation may be changed sequentially. In the system including plural NAND flash memories, this can flatten the abrasion as the whole system by executing the wear leveling among the different NAND flash memories.

Next, the algorithm of deciding the writing positions of Dia, Dib, and Pi is explained. Each of Dia, Dib, and Pi has a smaller size (second size) than the size (first size) of each physical sector. More specifically, here, the size of each of Dia, Dib, and Pi is ⅓ of the size of the physical sector. The physical unit storage region obtained by dividing the physical sector into three is referred to as a sub-sector. Dia, Dib, and Pi generated from the data Di are decided to be written in the same logical address of the different memory nodes 11. Strictly speaking, the sub-sector at the head of the physical sector indicated by the logical address is decided as the position where Dia are written. The sub-sector at the center of the physical sector indicated by the logical address is decided as the position where Dib are written. The sub-sector at the end of the physical sector indicated by the logical address is decided as the position where Pi are written. In the packet, the head of the sub-sector is expressed using the logical address corresponding to the physical address at the head of the physical sector to which the sub-sector belongs, and the offset value from the head of that physical sector.

The memory nodes 11 to which Dia, Dib, and Pi are written are decided based on a prescribed rule that defines the relation among the memory nodes 11. The prescribed rule is the storage method for the plural memory nodes 11 by the application of RAID, and is defined in the connection unit 14 and the rule is set according to the performance or the reliability requested by the user when the system is configured. Here, the memory node 11 to which Dia are written, the memory node 11 to which Dib are written, and the memory node 11 to which Pi are written are decided so that their X-coordinate values or Y-coordinate values are different from each other. For example, the rule is defined so that, in the case where the memory node 11 to which Dia are written is determined to be the memory node (xia, yia), the memory node 11 to which Dib are written is the memory node (xia+1, yia+1) and the memory node 11 to which Pi are written is the memory node (xia+2, yia+2).

Figure 15:
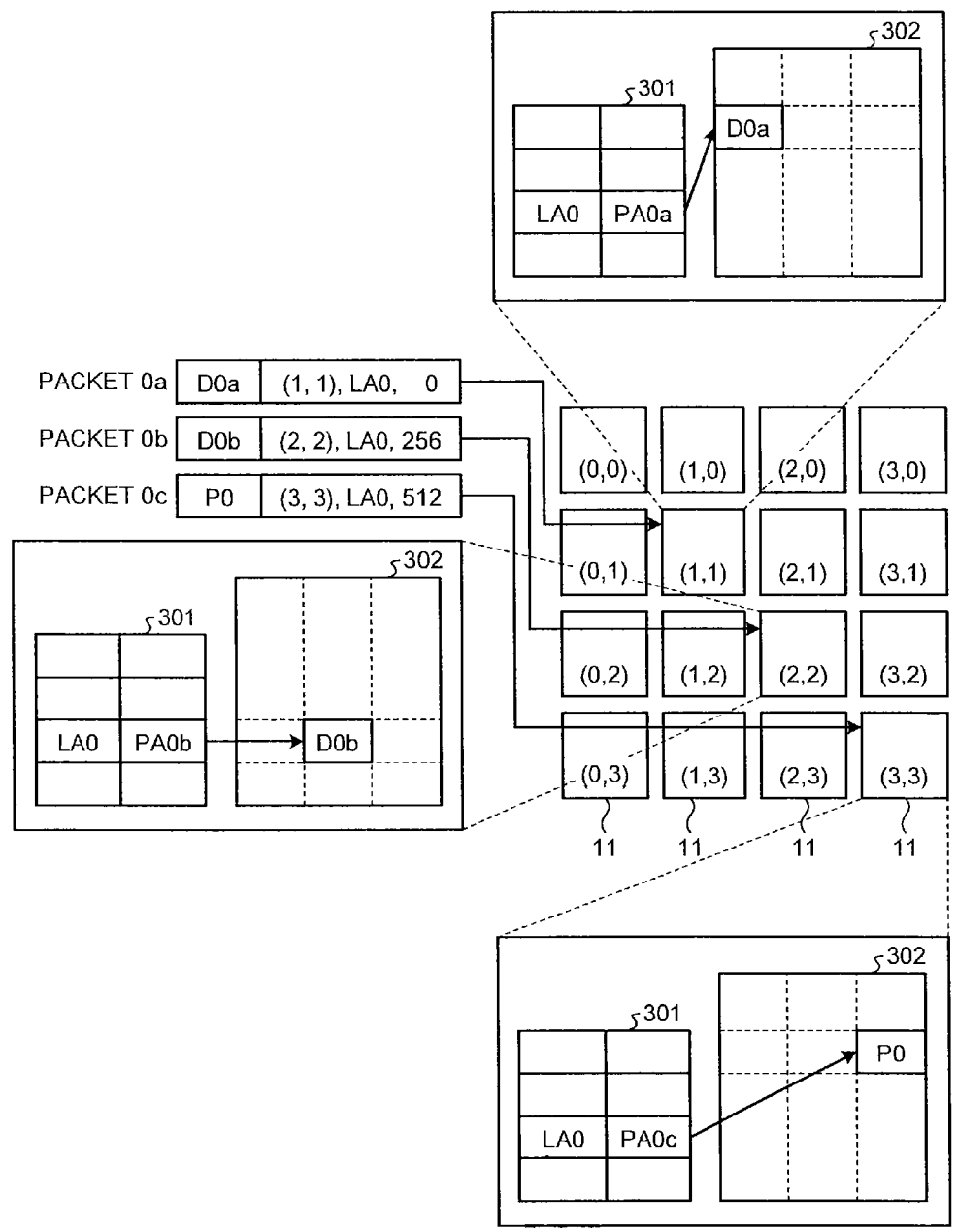
FIG. 15 is a conceptual diagram for explaining an example of data storage.

FIG. 15 is a conceptual diagram for explaining an example of data storage. The packets for writing Dia, Dib, and Pi are referred to as a packet ia, a packet ib, and a packet ic, respectively. Here, the sub-sector has a size of 256 B, and the physical sector has a size of 768 B. In this diagram, an example of a destination to which data D0 are stored is illustrated.

In the example depicted in FIG. 15, D0a, D0b, and P0 generated from D0 are stored in the memory node (1, 1), the memory node (2, 2), and the memory node (3, 3), respectively. The packet 0a for writing D0a has D0a, the node address (1, 1), the logical address LA0, and the offset value "0" recorded therein. The packet 0b for writing D0b has D0b, the node address (2, 2), the logical address LA0, and the offset value "256" recorded therein. The packet 0c for writing P0 has P0, the node address (3, 3), the logical address LA0, and the offset value "512" recorded therein.

In the memory node (1, 1) having received the packet 0a, LA0 is translated into the physical address PA0a on the basis of an L2P table 301 independently managed in the memory node (1, 1). PA0a indicates the position of the head of the specific physical sector in a physical address space 302 constituted by the storage region of the memory node (1, 1). Then, D0a are written at the position that is offset by the offset value "0" from the head of the physical sector indicated by PA0a in the nonvolatile memory 300. Similarly, in the memory node (2, 2) having received the packet 0b, LA0 is translated into the physical address PA0b on the basis of the L2P table 301 independently managed in the memory node (2, 2). PA0b indicates the position of the head of the specific physical sector in the physical address space 302 constituted by the storage region of the memory node (2, 2). Then, D0b are written at the position that is offset by the offset value "256" from the head of the physical sector indicated by PA0b in the nonvolatile memory 300. As for Pi, the physical position of the target memory node is decided through the similar procedure.

The relation between the global address, and the node address and the logical address is arbitrary. For example, the high-order digits of the global address and the node address of the memory node 1 to which Dia are written may correspond to each other one-to-one, and the low-order digits of the global address may be used as the logical address LAi. The first half of the high-order digits of the global address may correspond to the X-coordinate value of the node address, and the latter half of the high-order digits of the global address may correspond to the Y-coordinate value of the node address. When the node address of the memory node 11 to which Dia are written is decided, the node address of the memory nodes 11 to which Dib and Pi are written are automatically decided.

Figure 16:
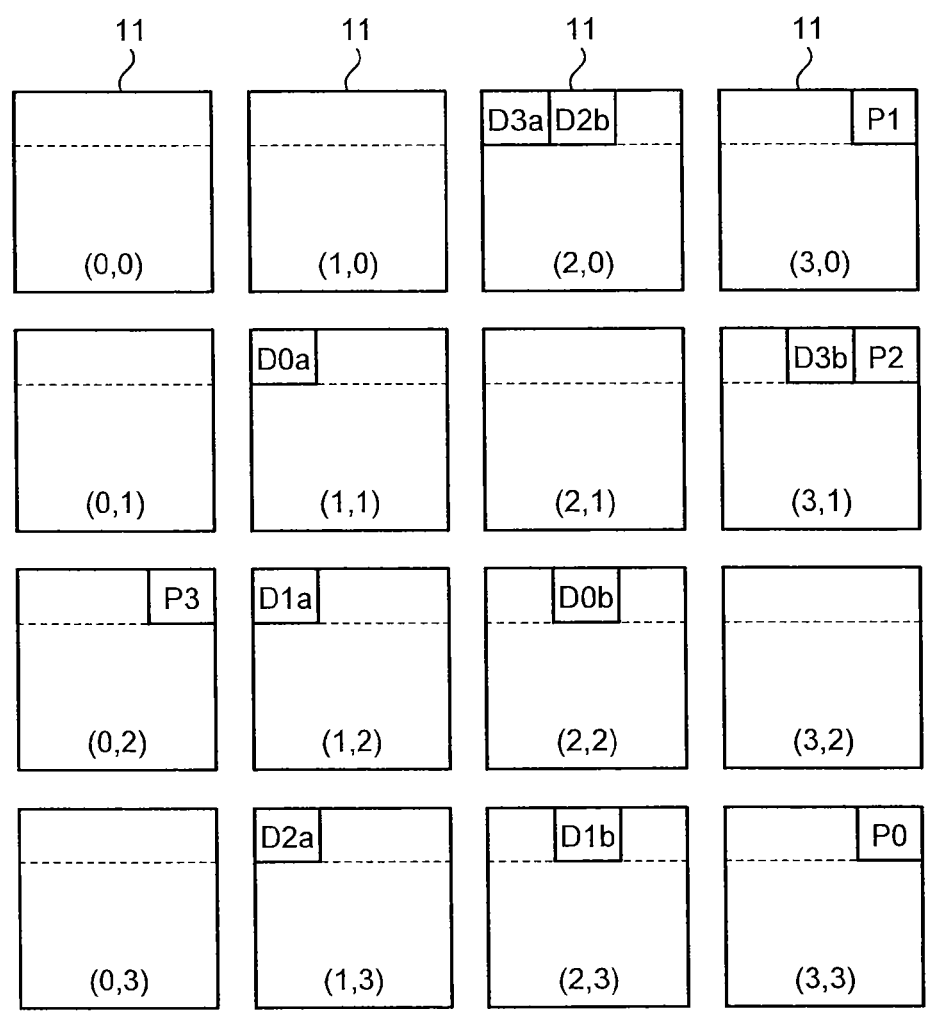
FIG. 16 is a conceptual diagram for explaining another example of data storage.

FIG. 16 is another conceptual diagram for explaining an example of data storage. FIG. 16 depicts the logical address space constituted by the storage region of the memory node 11 for every memory node 11. D1a are stored in the memory node (1, 2), D2a are stored in the memory node (1, 3), and D3a are stored in the memory node (2, 0). Thus, the three sub-sectors included in one physical sector store the data (data generated by division or the parity data) generated from different data.

Assuming that the number of divisions is N, the physical sector has a size that is N times as large as the size of the sub-sector, and Di has a size that is (N−1) times as large as the size of the sub-sector. In other words, the storage device 1 can process the write request in which the logical address is specified, for every piece of data with the size that is (N−1) times as large as the size of the sub-sector. The logical unit storage region with the size that is (N−1) times as large as the size of the sub-sector, in which the logical address is specified, is referred to as the logic sector. In the case where the size of the data requested to be written is greater than the size of the logical sector, after the requested data are divided for each logical sector in the load balancer 16 or the connection unit 14, the data for each logic sector may be further divided into the sub-sector unit in the connection unit 14.

Figure 17:
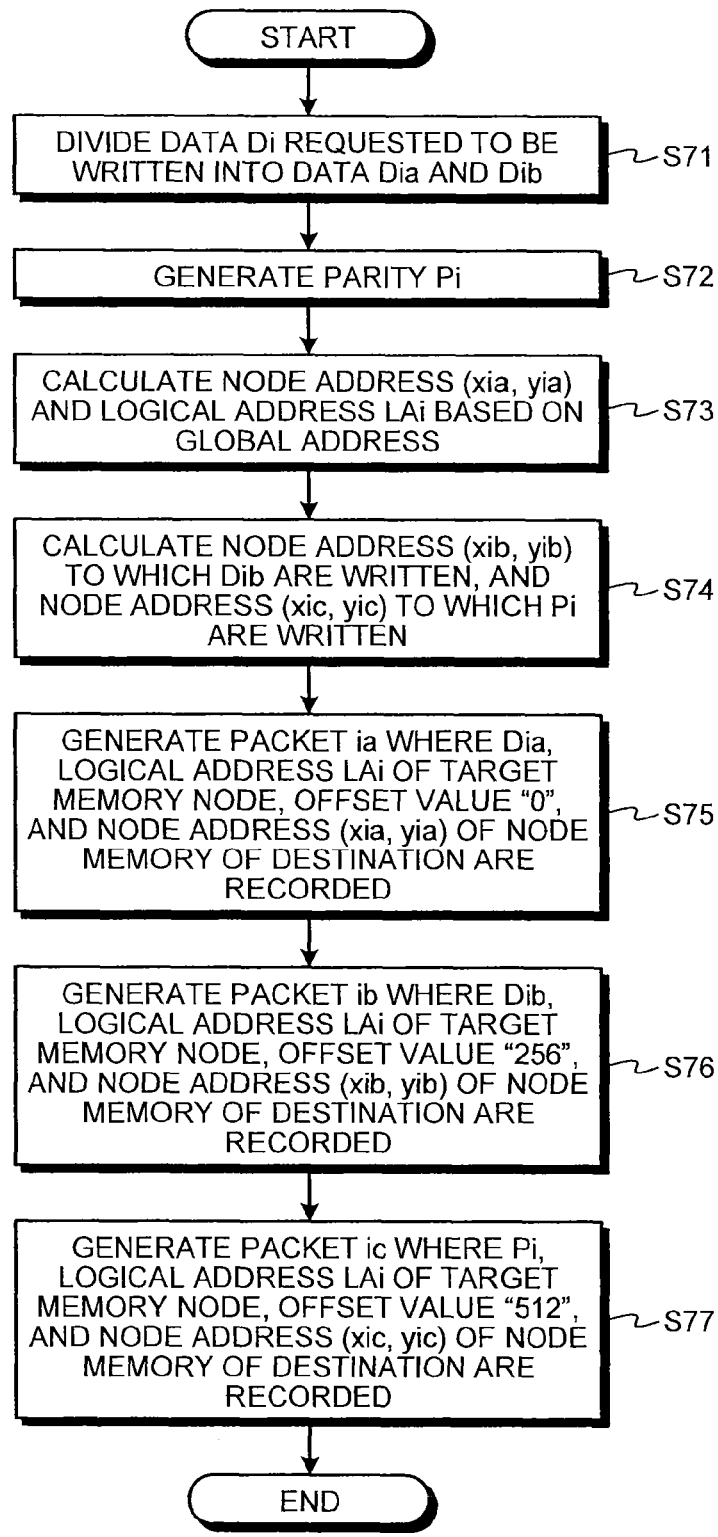
FIG. 17 is a flowchart for explaining an operation of a connection unit according to a third embodiment.

FIG. 17 is a flowchart for explaining the operation of the connection unit 14 according to the third embodiment. Here, the explanation is made of the operation of the connection unit 14 for generating the packets is to is on the basis of the request of writing Di.

First, the MPU 110 divides Di into the data Dia and Dib in sub-sector unit (S71). Then, the MPU 110 generates the parity Pi on the basis of Dia and Dib (S72). Next, the MPU 110 calculates the node address (xia, yia) of the destination to which Dia are written on the basis of the global address to which Di are written (S73).

Subsequently, the MPU 110 calculates the node address (xib, yib) to which Dib are written and the node address (xic, yic) to which Pi are written (S74). Here, for example, xib is the value obtained by adding 1 to xia, xic is the value obtained by adding 2 to xia, yib is the value obtained by adding 1 to yia, and yic is the value obtained by adding 2 to yia.

Note that the number of the memory nodes 11 arranged in the X direction is the value $N_X$, and the number of the memory nodes 11 arranged in the Y direction is the value N. In the process of Step S74, if the X-coordinate value of the target memory node is larger than $N_X$, the value obtained by subtracting, for example, $N_X-1$ from the coordinate value may be used as the X-coordinate value of the target memory node. If the Y-coordinate value of the target memory node is larger than $N_Y$, the value obtained by subtracting, for example, $N_Y-1$ from the coordinate value may be used as the Y-coordinate value of the target memory node.

Subsequently, the MPU 110 generates the packet is in which Dia, the logical address LAi of the target memory node, the offset value "0", and the node address (xia, yia) of the addressed memory node are recorded (S75). The MPU 110 generates the packet ib in which Dib, the logical address LAi of the target memory node, the offset value "256", and the node address (xib, yib) of the addressed memory node are recorded (S76). The MPU 110 generates the packet is in which Pi, the logical address LAi of the target memory node, the offset value "512", and the node address (xic, yic) of the addressed memory node are recorded (S77). After the process of Step S77, the operation of generating the packet ends.

Figure 18:
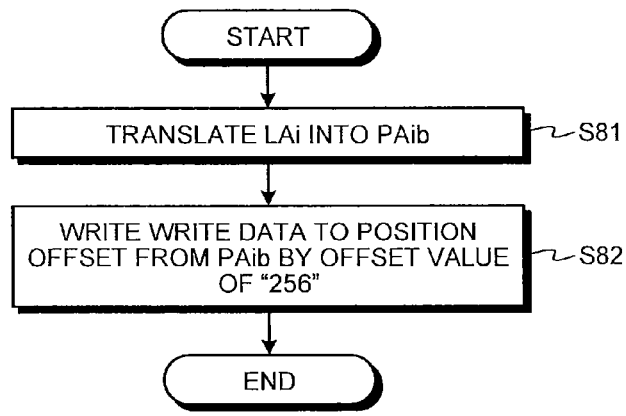
FIG. 18 is a flowchart for explaining an operation of a memory node according to a third embodiment.

FIG. 18 is a flowchart for explaining the operation of the memory node 11 according to the third embodiment. Here, the description is made of the operation of processing the packet ib by the memory node (xib, yib) to which the packet ib is addressed. The command processor 207 transtales LAi to PAib by referring to the L2P table 301 (S81). Then, the command processor 207 writes Dib in the position that is offset by the offset value "256" from PAib (S82). Thus, the operation for the packet ib ends. Here, the bit representing that the sub-sector has become valid may be set when the writing is performed. The presence of the bit map representing the validity allows the transfer of only the valid data when the entire data are copied or moved between the chips, thereby reducing the processing time. Although the memory node 11 having received the request for data writing writes data in the above description, the data may be accumulated in the buffer constituted by the RAM or the like having high random accessibility. The data in the buffer may be written in the nonvolatile memory 300 by the flush command, or may be automatically written when the writing units of the nonvolatile memory 30 are prepared.

Thus, in the third embodiment, each memory node 11 includes the plural physical sectors. The connection unit 14 divides the first data requested to be written into pieces of second data for each sub-sector with a smaller size than the physical sector, and writes each piece of second data into the physical sector of the different memory node 11. Here, the connection unit 14 specifies the position of writing each piece of the second data using the head position of the physical sector and the offset value of the sub-sector unit from the head position, that is different for each piece of the second data. Thus, each memory node 11 can identify the sub-sector specified by the connection unit 14, which is smaller than the physical sector, by merely managing the correlation between the logical address and the physical address in the physical sector unit. As compared with the case of managing the correlation in the sub-sector unit, the size of the L2P table 301 can be reduced. That is, the management of the reading/writing for every smaller storage region becomes possible while the increase in size of the L2P table 301 is suppressed.

In some cases, the plural memory nodes may be detachably mounted on a printed board for each column or each row. The connection unit 14 decides the memory node 11 to which the second data and the parity data are written so that the columns or rows do not overlap on each other. Therefore, even though one printed board gets in trouble and exchanged for a new one, the storage content of the memory node 11 mounted on the board before the exchange can be reconstructed in the memory node 11 mounted on the board after the exchange. The memory nodes on the printed board do not necessarily form a column or a row. In this case, it is desirable that the memory nodes form pairs across the different printed boards when the memory nodes to which the divided data are written are decided.

The storage device 1 may be configured so that the memory node 11 storing any data Di can be locked. In the case where the memory nodes 11 to which Dia, Dib, and Pi are written are decided at random, all the memory nodes 11 to which Dia, Dib, and Pi are written need to be locked at the same time. In the case where all the memory nodes 11 to which Dia, Dib, and Pi are written cannot be locked at the same time, for example, when the writing is performed from the plural connection units 14, the memory nodes compete with each other to be locked and the control becomes impossible. In the third embodiment, the connection unit 14 decides the memory node of the target memory node for every second data on the basis of the predetermined rule that defines the relation among the memory nodes 11. Therefore, for example, by merely locking the memory node 11 storing Dia, i.e., the data at the head of the second data generated by the division, the connection unit 14 can treat the memory nodes 11 storing Dib and Pi as the locked memory nodes. In other words, even though the three memory nodes 11 are not locked at the same time, the three memory nodes 11 are treated as being locked; thus, the competition for the lock can be prevented.

Although the RAID level 5 is described as the example in the third embodiment, the third embodiment is also applicable even in the case where the method of not generating the parity as in RAID level 0 (striping) is employed.

(Fourth Embodiment)

Figure 19:
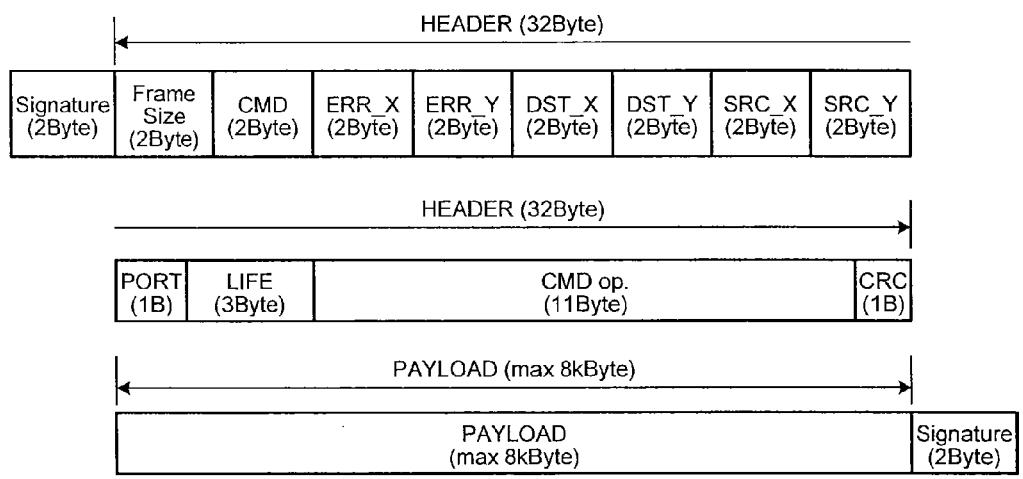
FIG. 19 is a diagram for explaining a configuration of a packet according to a fourth embodiment.

FIG. 19 is a diagram for explaining a configuration of a packet according to a fourth embodiment. The packet explained in the fourth embodiment has "Signature" each at the head and the end. "Signature" at the head is used for starting the reception of the serial data. "Signature" at the end is to transmit the error information on the transmission side (parity check for the buffer). If the parity error is found, a retransmission process is performed.

"Frame Size" refers to the size of a payload (first payload). The unit of numerals recorded in "Frame Size" is, for example, B (Byte) and the numerals do not contain the size of the Signature part. In "CMD", the identification number (command number) of the type of the command to be executed by the controller 200 is recorded. "SRC" represents the node address of the memory node 11 that has transmitted the packet, and "DST" represents the node address of the memory node 11 to which the packet is addressed. The subscript "X" and "Y" for "SRC" and "DST" represent the X coordinate and Y coordinate of the node address, respectively. If the relative node address can be used, the absolute coordinate for the destination is not necessarily used for "DST".

In "ERR", the notification destination for the error notification is recorded. If the node address recorded in "SRC" is broken in the upstream packet (packet from the connection unit 14 to the memory node 11) or if the node address recorded in "DST" is broken in the downstream packet (packet from the memory node 11 to the connection unit 14), the correction is possible by using the value recorded in "ERR".

In "PORT", the port number as the information representing the direction of the connection unit 14 to which the packet has been input is recorded. If the response packet returns to the memory node 11 that has transmitted the packet based on which the response is made, the memory node 11 that has transmitted the packet specifies the output port connected to the connection unit 14, by using the value recorded in "PORT". Then, the memory node 11 that has transmitted the packet transfers the response packet to the specified output port.

"LIFE" represents the lifetime of the packet. The lifetime is subtracted by one every time the packet stagnates due to the congestion. When the value recorded in "LIFE" has become equal to "0", the packet is discarded. In the case where another memory node 11 is additionally connected the existing memory node 11, the existing memory node 11 transmits the coordinate setting command for setting the node address to the added memory node 11. In "LIFE" in the packet of the coordinate setting command, for example, "1" is set. In the response packet to the coordinate setting command, for example, the value that is four times as large as the distance (|DST_X−SRC_X|+|DST_Y−SRC_Y|) is set.

In "CMD op.", the argument of the command is recorded. In "CRC", the CRC8 value of the header part (Frame Size to CMD op.) is recorded. Another value is also applicable as long as the error of the header part can be detected. In the payload, the data or the error information is recorded.

The data to be written in the nonvolatile memory 300 are randomized by being divided for each unit data of a predetermined size (here, 8 bits). To 8 bits of the unit data, which have been randomized, 3 bits of randomizing information are added. An ECC code may be further added to the unit data after the addition of the randomizing information.

Figure 20:
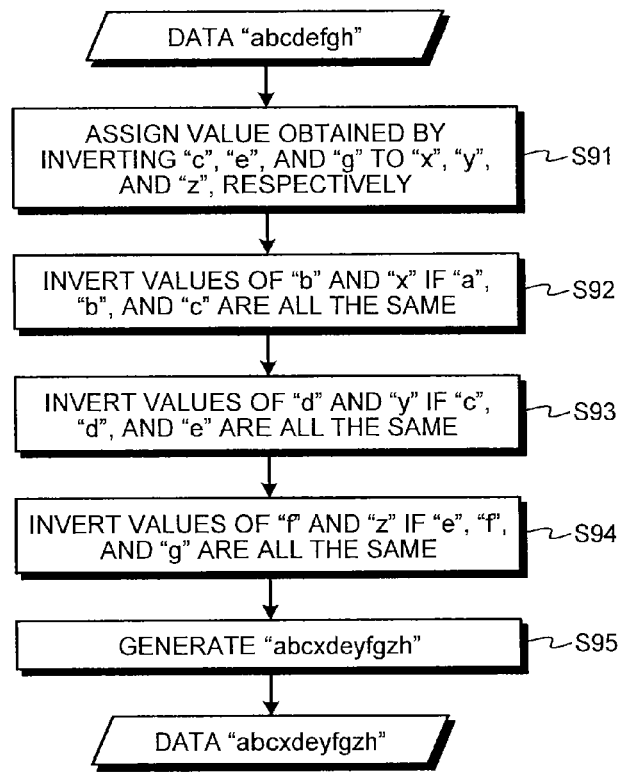
FIG. 20 is a diagram for explaining a randomizing process.

FIG. 20 is a diagram for explaining the randomizing process. Here, the 8 bits of data to be randomized are represented by the alphabet string ranging from "a" to "h" (i.e., "abcdefgh"). Each alphabet is 1 bit of data, so that the alphabet string constitutes 8 bits of data to be randomized. Each bit constituting the randomizing information is referred to as "x", "y", and "z".

First, the values obtained by inverting "c", "e", and "g" are assigned to "x", "y", and "z", respectively (S91). If the first three serial bits "a", "b", and "c" are the same values (i.e., "a", "b", and "c" are all "1", or "a", "b", and "c" are all "0"), the values of "b" and "x" are inverted (S92). Then, if the central three serial bits "c", "d", and "e" are all the same values, the values of "d" and "y" are inverted (S93). Further, if the last three serial bits "f", "f", and "g" are all the same values, the values of "f" and "z" are inverted (S94). Then, "abcdefgh" and "xyz" are merged (S95), so that "abcxdeyfgzh" as the randomized data are generated.

When the randomized data "abcxdeyfgzh" are decoded (hereinafter, decoding from randomization), the value of "c" and the value of "x" are compared and if the both are the same value, the value of "b" is inverted. Similarly, the value "e" and the value "y" are compared and the value "g" and the value "z" are compared, so that the randomized data are decoded into the data before the randomization.

As aforementioned, in the header part, the CRC8 value is recorded in "CRC". Based on the value recorded in "CRC", the error from the communication is detected. When the data are recorded in the payload, the data are recorded together with the ECC code. From the data recorded in the payload, the error from the communication is detected and corrected based on the ECC code added to the data. The ECC code may be, for example, a BCH (15, 11) code. In this case, for detecting or correcting the error occurring in writing to or reading from NAND flash memory, 4 bits of the ECC code as the redundant bits are added to 1 bit of unit data including the randomizing information.

Each process of the randomizing, the decoding from randomization, the encoding of the ECC code (hereinafter, ECC encoding), and the decoding of the ECC code (hereinafter, ECC decoding) may be executed in any of the memory node 11 and the connection unit 14. Which one of the memory node 11 and the connection unit 14 executes the process may be different depending on the command.

Figure 21:
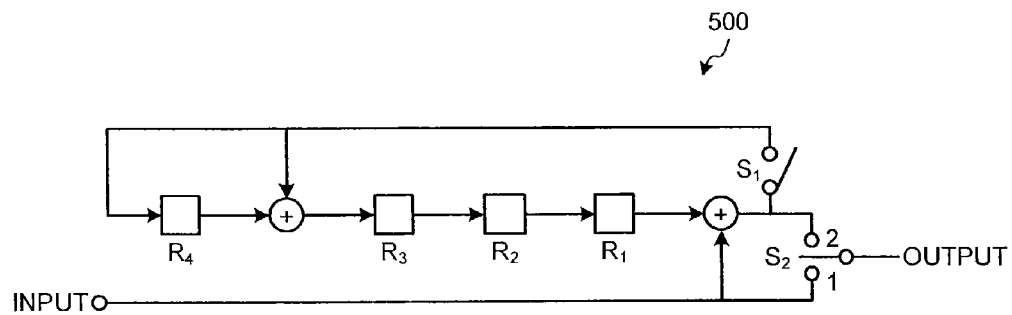
FIG. 21 is a diagram for explaining an example of a configuration of a code generating circuit for BCH (15, 11) code.

FIG. 21 is a diagram depicting a example of a configuration of a generation circuit for the BCH (15, 11) code. When 11 bits of unit data are input to an encoding circuit 500, a switch SW1 is turned on and a switch SW2 is turned to "1". After the 11 bits of unit data are output, the switch SW1 is turned off and the switch SW2 is turned to "2" for outputting the ECC code calculated and saved in R1 to R4. Thus, 4 bits of ECC codes are output from the encoding circuit 500. While the encoding circuit 500 outputs the ECC code, "0" is input.

During the ECC decoding, a 4-bit value called syndrome is calculated. The syndrome is calculated in the encoding circuit 500. The input of the encoding circuit 500 is 15 bits of unit data including the ECC code. The unit data input on the ECC decoding are different from those on the ECC encoding in that the input of 4 bits after the 12-th bit is not all "0". If the 4-bit value of the syndrome after the calculation is all "0", no error is detected and the value is output as it is. If the syndrome contains the value other than "0", the error bit is corrected (i.e., inverted) on the basis of the relation between the syndrome and the error bit (see FIG. 22).

In the fourth embodiment, the L2P table 301 and a garbage collection table (GC table) are included in the target to be read out from the outside of the memory node 11.

In the nonvolatile memory 300, as the invalid old data increase, the region where the new data can be written decreases. The memory node 11 executes the process called garbage collection when the region where the new data can be written gets in shortage. The garbage collection is a process in which the valid data are collected in a particular block, and the block having only the invalid data is erased to generate a block that is not used. The generated block is registered in the GC table. Specifically, the physical address of the head of the block (hereinafter, block address) is registered in the GC table. The GC table is configured to allow the entry to be added and extracted according to the FIFO rule, for example. If there are 2048 blocks, the GC table needs to have a size that allows the registration of the 2048 block addresses each having a size of 11 bits. The GC table is held in the RAM 400, for example.

In the fourth embodiment, for example, the L2P table 301 stores the correlation between the logical address and the physical address (i.e., block address) for each block. Each block has 128 pages, for example.

The packet includes "CMD" in which the command number is recoded and "CMD op." in which the argument is recorded. An example of the command and the argument is explained below. The format of the argument is not limited to the following format as long as the specified content is equal. For executing the command, one of or both the randomizing of the writing data and the ECC encoding may be performed, and one of or both the decoding from randomization and the ECC decoding may be performed.

(1) Raw_Read (Page, Start Col., End Col.)

This command is to read out from the nonvolatile memory 300. In the argument, "page" represents the page number, "start col." represents the column to start the readout, and "end col." represents the column to end the readout. The memory node 11 reads out the data and performs the ECC decoding on the basis of the ECC code included in the readout data, and after the ECC decoding, the data are recorded in the payload of the response packet and this packet is transmitted.

(2) Raw_Write (Page, Start Col., End Col.)

This command is to write in the nonvolatile memory 300. "Raw_Write" includes the argument for specifying the page and the column, in a manner similar to "Raw_Read". However, in the case of "Raw_Write", the argument is to specify the writing position. The write data are recorded in the payload. If the data length of the write data is so short that the extra portion is generated in the payload, the bit string representing the value "10" is repeatedly recorded in the extra portion. The memory node 11 decodes the ECC code included in the write data and after the decoding, the write data are written. Then, the memory node 11 records the result as to whether the writing has been successful or not in the header of the packet, and transmits the packet.

(3) Raw_Erase (Page)

This command is to erase the content stored in the nonvolatile memory 300. The block to be erased is specified by the argument "page". In other words, the block including the page specified by "page" is the target to be erased. After the erasure, the memory node 11 records the result as to whether the erasure has been successful or not in the header of the packet, and transmits the packet.

(4) L2P_Read (LA)

This command is to read out the L2P table 301. The argument "LA" represents the logical address. By referring to the L2P table 301, the memory node 11 reads out the physical address (block address) corresponding to "LA" and records the readout block address in the payload of the response packet, and then transmits that packet.

(5) L2P_Write (LA, Key 1, Key 2)

This command is to write in the L2P table 301. "LA" included in the argument "L2P_Write" represents the logical address. "key 1" and "key 2" each have a size of 2 byte, for example. The memory node 11 reads out the block address corresponding to "LA" by referring to the L2P table 301. Then, the memory node 11 compares the readout block address with the value of "key 1 " included in the argument, and if the both coincide, the block address corresponding to "LA" is overwritten with the value of "key 2". After the overwriting, the memory node 11 records the response of the information that the overwriting has been done successfully in the header of the packet, and transmits that packet. If the both do not coincide, the memory node 11 records the response of the information that the overwriting has been failed in the header of the packet, and transmits that packet.

(6) GC_Read ( )

This command is to read out the GC table. The memory node 11 reads out all the block addresses registered in the GC table in the format that can identify the order of registration, and records all the readout block addresses in the payload of the response packet, and then transmits that packet.

(7) GC_Push (BLK)

This command is to register the new entry in the GC table. "BLK" as the argument represents the physical address of the head of the block. The memory node 11 adds the value of "BLK" to the end of the GC table. Then, the memory node 11 records the response as to whether the addition has been done successfully or not in the header of the packet and transmits that packet.

(8) GC_Shift ( )

This command is to acquire the block address from the GC table. The memory node 11 reads out the block address registered in the head of the GC table. Then, the memory node 11 records the readout block address in the header of the response packet, and then transmits that packet. After that, the memory node 11 shifts each entry registered in the GC table one by one toward the head.

(9) Read (LA1, Key, LA2, Page in BLK, Start Col., End Col.)

This command is to read out from the nonvolatile memory 300 using the L2P table 301. "LA1" and "LA2" included in the argument represent the logical addresses. "key" included in the argument has a size of 2 B. "page in BLK" included in the argument represents the physical address for specifying the page in one block. The memory node 11 reads out the block address corresponding to "LA1" by referring to the L2P table 301. The memory node 11 then compares the readout block address and the value of "key" included in the argument, and if the both coincide, the memory node 11 executes the readout process as below. If the both do not coincide, the memory node 11 does not execute the readout process, records the error information 1 in the header of the response packet, and then transmits that packet.

In the readout process, the memory node 11 reads out the block address corresponding to "LA2" by referring to the L2P table 301. If the readout of the block address is failed, the memory node 11 records the error information 2 in the header of the response packet and transmits that packet. If the readout of the block address is done successfully, the memory node 11 multiplies the readout block address by the page number per block, for example 128, and adds "page in BLK" to the value obtained by the multiplication. The memory node 11 then reads out the data in the nonvolatile memory 300 from the columns ranging from "start col." to "end col." of the page indicated by the physical address obtained by the addition. The memory node 11 performs the ECC decoding on the basis of the ECC code included in the readout data. Then, after the ECC decoding, the memory node 11 records the data in the payload of the response packet and transmits that packet.

(10) Write (LA1, Key, LA2, Page in BLK, Start Col., End Col.)

This command is to write in the nonvolatile memory 300 using the L2P table 301. The memory node 11 reads out the block address corresponding to "LA1" by referring to the L2P table 301. Then, the memory node 11 compares the readout block address and the value of "key" included in the argument, and if the both coincide, the memory node 11 executes the writing process as explained below. If the both do not coincide, the memory node 11 does not execute the writing process and records the error information in the header of the response packet, and then transmits that packet.

In the writing process, the memory node 11 reads out the physical address corresponding to "LA2" by referring to the L2P table 301. If the readout of the block address corresponding to "LA2" is failed, the memory node 11 acquires the block address from the GC table and registers the acquired block address in the L2P table 301 while associating the acquired block address with the value of "LA2". Then, the memory node 11 multiplies the block address read out from the L2P table 301 or acquired from the GC table by the number of pages per block, for example, 128, and adds "page in BLK" to the value obtained by the multiplication. Next, the memory node 11 writes the data in the columns as the target memory node, ranging from "start col." to "end col." of the page indicated by the physical address obtained by the addition. The memory node 11 decodes the ECC code included in the write data and after the decoding, writes the write data in the target memory node. Then, the memory node 11 records the result as to whether the writing has been successful or not in the header of the response packet, and then transmits that packet.

Note that in the case where the memory node 11 acquires the block address from the GC table, the memory node 11 executes the shift of the entry registered in the GC table in a manner similar to the case of "GC_Shift". Furthermore, the memory node 11 records the information that the physical address has been acquired, in the header of the response packet and then transmits that packet.

(11) Erase (LA1, Key, LA2)

This command is to erase the content stored in the nonvolatile memory 300 using the L2P table 301. By referring to the L2P table 301, the block address corresponding to "LA1" is read out. The memory node 11 then compares the readout block address and the value of "key" included in the argument, and if the both coincide, the memory node 11 executes the erasing process as explained below. If the both do not coincide, the memory node 11 does not execute the erasing process and records the error information 1 in the header of the response packet and then transmits that packet.

In the erasing process, the memory node 11 reads out the block address corresponding to "LA2" by referring to the L2P table 301. If the readout of the block address is failed, the memory node 11 records the error information 2 in the header of the response packet and then transmits that packet. If the readout of the block address is successful, the memory node 11 erases the block indicated by the readout block address. After the erasure, the memory node 11 invalidates the correlation between "LA2" recorded in the L2P table 301 and the block address to be erased, and registers the block address to be erased in the GC table. In the occurrence of the error in the erasure, the memory node 11 does not add the block address in the GC table and records this fact in the header of the response packet, and then transmits that packet.

(12) Activate ( )

This command is to transit the state of the nonvolatile memory 300 to the accessible state (normal operation state). The memory node 11 transits the state of the nonvolatile memory 300 to the normal operation state, and causes an LED of the memory node 11 to display the normal operation state. The LED may display the normal operation state in a lighted state, or may display the normal operation state in a non-lighted state

(13) Deactivate ( )

This command is to transit the state of the nonvolatile memory 300 to the inaccessible state. The inaccessible state refers to the state in which data cannot be written in or read out from the nonvolatile memory 300 in executing any command of "Read", "Write", "Erase", "L2P_Read", "L2P_Write", and "L2P_Erase".

(14) L2P Backup (Page)

This command is to write the L2P table 301 and the GC table held in the RAM 400 in the nonvolatile memory 300. The memory node 11 reads out the L2P table 301 and the GC table from the RAM 400, and randomizes the readout data and has the readout data subjected to the ECC encoding. Then, the memory node 11 writes the data in the successive pages whose heads are the physical addresses specified by "page", and the result as to whether the writing has been successful or not is recorded in the header of the response packet and then transmits the header.

(15) L2P_Restore (Page)

This command is to read out the L2P table 301 and the GC table stored in the nonvolatile memory 300 to the RAM 400. The memory node 11 reads out the L2P table 301 and the GC table from the nonvolatile memory 300, and has the readout data subjected to the ECC decoding and the decoding from the randomization. Then, the memory node 11 develops the data, which have been subjected to the ECC decoding and the decoding from the randomization, in the RAM 400. Note that after the ECC decoding, the memory node 11 discards the redundant bit for the ECC code. After the development, the memory node 11 records the result as to whether the development has been successful or not in the header of the response packet, and then transmits that packet.

(16) L2P_Add (LA1, Key, LA2, Value)

This command is to add a value to a desired block address recorded in the L2P table 301. "value" has a size of, for example, 16 bits. The memory node 11 reads out the block address corresponding to "LA1" by referring to the L2P table 301. The memory node 11 then compares the readout block address and the value of "key" included in the argument, and if the both coincide, the memory node 11 executes the adding process as explained below. If the both do not coincide, the memory node 11 does not execute the adding process and records the error information in the header of the response packet, and then transmits that packet.

In the adding process, the memory node 11 adds the value of "value" to "LA2". Then, the memory node 11 updates the logical address "LA2" recorded in the L2P table 301 with the value obtained by the addition. Note that the most significant bit of "LA2" represents overflow. If the most significant hit has become "1" once by the adding process, the value is maintained as "1" thereafter.

(Fifth Embodiment)

Figure 23:
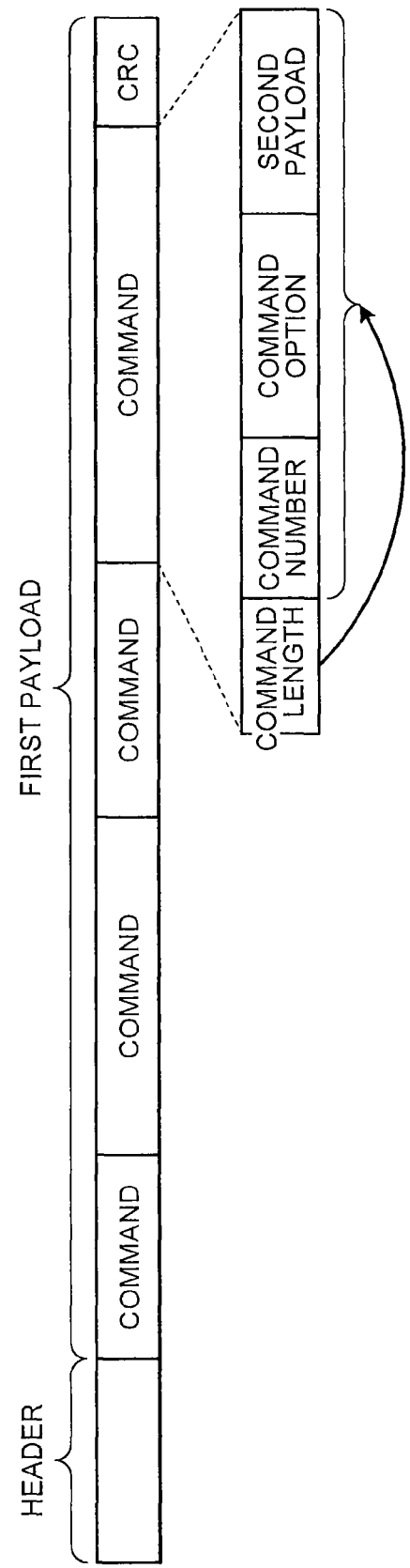
FIG. 23 is a diagram for explaining a configuration of a packet according to a fifth embodiment.

FIG. 23 is a diagram for explaining a configuration of a packet according to a fifth embodiment. In the packet according to the fifth embodiment, a plurality of commands is recorded in the payload (first payload). The individual command has the command length, the command number, the command option, and the payload of the command itself (second payload) recorded in this order. The memory node 11 can execute the commands stored in the first payload in the order from the head. The configuration in which the first payload has the plural commands is hereinafter referred to as the successive command configuration. In contrast to this, the configuration of the packet according to the fourth embodiment depicted in FIG. 19 is referred to as a single command configuration.

Note that the command option and the second payload are different in size depending on the command. One of or both the command option and the second payload may or may not be provided depending on the command.

The header of the packet with the successive command configuration may be equal to the header of the packet with the single command configuration. In the header of the packet with the successive command configuration, the command numbers representing the successive command configuration are recorded in "CMD". In other words, the memory node 11 can determine whether the configuration of the packet is the successive command configuration or not, on the basis of the command numbers recorded in "CMD". If the configuration of the packet is not the successive command configuration, the memory node 11 executes the operation explained in the fourth embodiment on the basis of the command numbers recorded in "CMD".

Next, an example of the command recorded in the first payload is described. Note that in the fifth embodiment, the following description is related to the packet with the successive command configuration.

(1) COPY (MEM_ADDRESS from, LENGTH Length, MEM_ADDRESS to, FLAG Pointer)

This command is to copy data between the memories in the memory nodes 11. "MEM_ADDRESS from" represents the region from which the data are copied, "MEM_ADDRESS to" represents the region to which the data are copied, and "LENGTH length" represents the size of the data to be copied. In each of "MEM_ADDRESS from" and "MEM_ADDRESS to", the identification number (MEM_KIND) representing the data save region and the address information (ADDRESS) representing the position in the data save region indicated by "MEM_KIND" are recorded. "MEM_KIND" has a size of 4 bits here. An example of the correlation between the data save region and the value of "MEM_KIND" is illustrated below.

00: buffer region
01: calculation buffer region
02: calculation buffer region
03: calculation buffer region
04: calculation buffer region
05: SRAM 208
06: nonvolatile memory 300
07: RAM 400
08: reception header region
09: reception payload region
10: transmission header region
11: transmission payload region In "COPY", all of those above can be used as "MEM_KIND". Other memory regions than those above may be applicable.

Note that the buffer region, the four calculation buffer regions, the reception header region, the reception payload region, the transmission header region, and the transmission payload region are secured in the memory included in the memory node 11 (such as the RAM 400 or the SRAM 208) or in the register in advance. Upon the reception of the packet addressed to the own memory node 11, the memory node 11 stores the header constituting the received packet in the reception header region, and stores the first payload constituting the received packet in the reception payload region. The memory node 11 can generate the packet addressed to the connection unit 14 or the other memory node 11, and transmit the packet thereto. When the memory node 11 generates the packet, the memory node 11 generates the header in the transmission header region and generates the first payload in the transmission payload region. The buffer region stores temporary data. The calculation buffer region temporarily stores the original data of the calculation or temporarily stores the result data from the calculation.

Note that the region from which the data are copied may store the pointer. "FLAG pointer" represents whether the target of the copy is the data (or pointer if the pointer is stored) stored in the region designated as the region from which the data are copied or the data stored in another region indicated by the pointer stored in the region designated as the region from which the data are copied. "FLAG pointer" refers to the information with a size of 1 bit representing the former if "FLAG pointer" is "0" and the latter if "FLAG pointer" is "1". Whether the data are the pointer or the data other than the pointer (hereinafter referred to as "actual data") is determined by the most significant bit of the data.

The pointer includes meta-information (META) and the address information (MEM_ADDRESS). "META" includes "FLAG pointer", "LENGTH length", and "RIGHT right". "FLAG pointer" included in "META" is equal to "FLAG pointer" included in the argument of "COPY". "MEM_ADDRESS" has the configuration similar to "MEM_ADDRESS from", etc.

Figure 24:
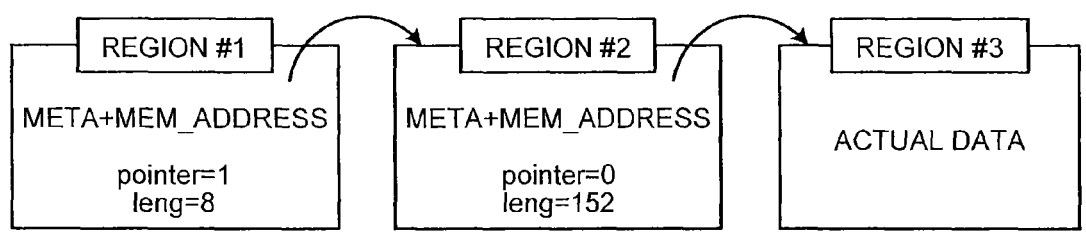
FIG. 24 is a conceptual diagram for explaining a method of specifying the copy target.

FIG. 24 is a conceptual diagram for explaining a method of specifying the copy target in the case where "1" is recorded in "FLAG pointer" included in "COPY". First, "MEM_ADDRESS from" included in "COPY" represents the region #1. The region #1 stores the pointer. "MEM_ADDRESS" included in the pointer stored in the region #1 represents the region #2.

The region #2 stores the pointer. Since "1" is recorded in "FLAG pointer" included in the pointer stored in the region #1, the pointer stored in the region #2 is not the copy target.

"MEM_ADDRESS" included in the pointer stored in the region #2 represents the region #3. The region #3 stores the actual data. In "FLAG pointer" included in the pointer stored in the region #2, "0" is recorded. Therefore, the actual data stored in the region #3 are specified as the copy target.

(2) EXCHANGE (MEM_ADDRESS from, LENGTH Length, MEM_ADDRESS to)

This command is to exchange data between the memories in the memory node 11. The memory node 11 exchanges the data with a size of "LENGTH length" stored in "MEM_ADDRESS from" and the data with a size of "LENGTH length" stored in "MEM_ADDRESS to". In "EXCHANGE", it is desirable that the memory with high random accessibility, such as "00 (buffer region)", "05 (SRAM 208)", and "07 (RAM 400)", can be used as "MEM_KIND".

(3) OPERATE (OP_TYPE Type, LONG Val, MEM_KIND Target, MEM_KIND Result)

This command is to calculate. "OP_TYPE type" represents the type of calculation. "OP_TYPE type" here has a size of 3 bits. An example of the correlation between the type of calculation and the value of "OP_TYPE type" is explained below.

| | |
|---|---|
| 00: | addition |
| 01: | << |
| 02: | >> |
| 03: | AND |
| 04: | OR |

-continued

| | |
|---|---|
| 05: | NOT |
| 06: | XOR |

"LONG val" is the integer used in the calculation. "MEM_KIND target" represents a data save region in which the data to be calculated are stored, and "MEM_KIND result" represents a data save region in which the calculation results are stored. In "OPERATE", "01 (calculation buffer region)," "02 (calculation buffer region)", "03 (calculation buffer region)", and "04 (calculation buffer region)" can be used for "MEM_KIND target" and "MEM_KIND result".

Each of the four calculation buffer regions has a size of 8 bytes. In the calculation of bit shift ("01 (<<)" and "02 (>>)"), the calculation buffer region is padded with "0". In the execution of the calculation of "00 (adding)", the most significant bit of the calculation buffer region is used as the bit representing whether the overflow has occurred or not. For example, in the most significant bit of the calculation buffer region, "1" represents that the overflow has occurred and "0" represents that the overflow has not occurred.

(4) COMPARE (COMP_TYPE Type, LONG Value, MEM_KIND Target, MEM_KIND Result)

This command is to make comparison between the memories in the memory node 11. "COMP_TYPE type" represents the type of comparison. "COMP_TYPE type" here has a size of 3 bits. The correlation between the type of the comparison and the value of "COMP_TYPE type" is illustrated below.

| | |
|---|---|
| 00: | ==value |
| 01: | !=value |
| 02: | >=value |
| 03: | >value |
| 04: | <=value |
| 05: | <value |

"MEM_KIND target" represents the data save region in which the data to be compared are stored, and "MEM_KIND result" represents the data save region in which the comparison results are stored. In "COMPARE", "01 (calculation buffer region)," "02 (calculation buffer region)", "03 (calculation buffer region)", and "04 (calculation buffer region)" can be used for "MEM_KIND target" and "MEM_KIND result". The memory node 11 writes "0x01" when the comparison result is "true" and writes "0x00" when the comparison result is "false".

(5) UNLESS_GO (MEM_KIND Target, LENGTH Jump)

This command is to branch the condition. "MEM_KIND target" represents the data save region in which the data for determining the conditional branch are stored. In "UNLESS_GO", "01 (calculation buffer region)," "02 (calculation buffer region)", "03 (calculation buffer region)", and "04 (calculation buffer region)" can be used for "MEM_KIND target". "LENGTH jump" represents the number of commands. When the least significant bit of the calculation buffer region indicated by "MEM_KIND target" is "1", the memory node 11 executes the command recorded right after "UNLESS_GO". When the least significant bit of the calculation buffer region indicated by "MEM_KIND target" is "0", the memory node 11 executes the command recorded in the position jumped by the number of commands indicated by "LENGTH jump" from the command recorded right after "UNLESS_GO". For example, by recording "UNLESS_GO" after "COMPARE" in the first payload, the conditional branch by "UNLESS_GO" can be executed according to the comparison result by "COMPARE".

(6) SEND (FLAG to_CU)

This command is to have the memory node 11 execute the transmission of the packet. "FLAG to_CU" represents whether the packet is addressed to the connection unit 14 or another memory node 11. "FLAT to_CU" is the information with a size of 1 bit, representing the former if "FLAT to_CU" is "1" and the latter if "FLAT to_CU" is "0". The memory node 11 calculates "LIFE", "CRC", and "Frame Size" included in the header, and records the calculation result in the transmission header region. Then, the memory node 11 generates the packet by recording the content stored in the transmission header region in the header and the content stored in the transmission payload region in the first payload.

In the default setting, the memory node 11 stores the node address of the destination stored in the reception header region in the transmission payload region as the node address of the source, and stores the node address of the source stored in the reception header region in the transmission payload region as the node address of the destination. If the value of "FLAG to_CU" is "0", the node address of the destination stored in the transmission header region is overwritten with the desired node address by the use of "COPY".

For example, the content of the response can be stored in the transmission payload region, and the content of the response can be transmitted via the connection unit 14. The successive commands after the desired command among the commands recorded in the first payload can be stored in the transmission payload region, and the successive commands can be executed by the other memory node 11.

(7) VARI_FILTER (CHAR Start, CHAR End, MEM_ADDR addr, LENGTH Length, FLAG Part)

This command is to retrieve the character string with a variable length. The retrieve object ranges from the character recorded in "CHAR start" to the character recorded in "CHAR end" in the data stored in the buffer region. If the buffer region includes a plurality of pieces of data ranging from the character recorded in "CHAR start" to the character recorded in "CHAR end", those pieces of data correspond to the data as the retrieval object. "MEM_ADDR addr" represents the position at the head of the search string, and "LENGTH length" represents the size of the search string. In other words, the memory node 11 reads out the data with a size represented by "LENGTH length" from the position represented by "MEM_ADDR addr", and makes the readout data the search string. If the data in the range of the retrieval object coincide partly or entirely with the search string, the memory node 11 stores the data in the range of the retrieval object in the transmission payload region. If the transmission payload region overflows, the error is caused. "FLAG part" represents whether the partial match retrieval or perfect match retrieval is conducted.

(8) FIX_FILTER (LENGTH Size, MEM_ADDR addr, LENGTH Length, FLAG Part)

This command is to retrieve the string with a fixed length. The range of the retrieval object covers each piece of divisional data obtained by dividing the data stored in the buffer region for each size represented by "LENGTH size" from the head. "MEM_ADDR addr" represents the position at the head of the search string, and "LENGTH length" represents the size of the search string. The memory node 11 sequentially compares the search string with the divisional data of the retrieval object. If the divisional data as the retrieval object coincide partly or perfectly with the search string, the memory node 11 stores the partly or entirely matched divisional data in the transmission payload region. If the transmission payload region overflows, the error is caused. "FLAG part" represents whether the partial match retrieval or perfect match retrieval is conducted.

Figure 25:
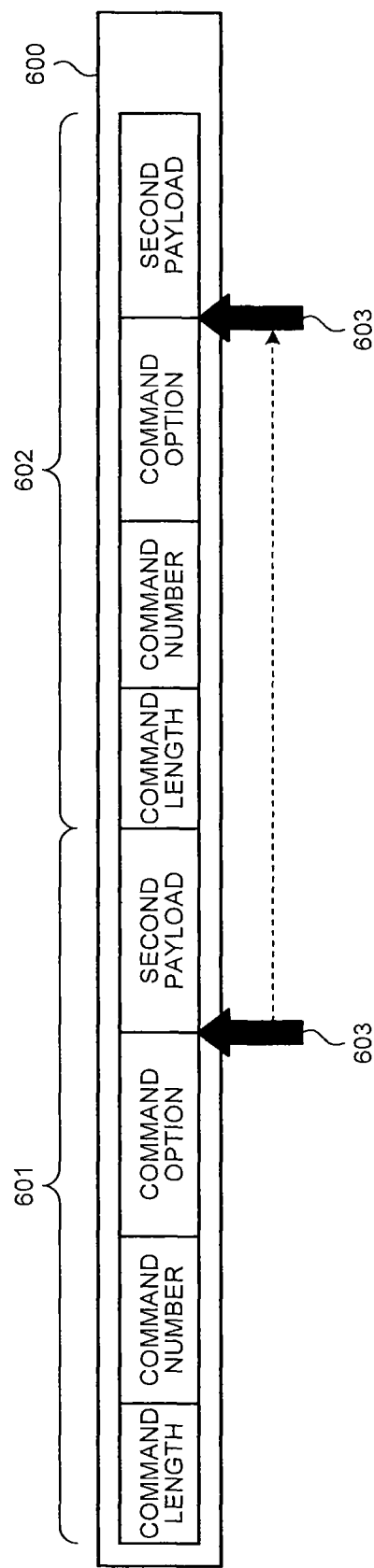
FIG. 25 is a diagram for explaining a head pointer.

The memory node 11 includes the head pointer for managing the position where the data stored in the reception payload region are read out. FIG. 25 is a diagram for explaining the head pointer. A reception payload region 600 stores a plurality of commands (a command 601 and a command 602) recorded in the first payload. The command 601 and the command 602 are serially executed by the memory node 11. In the execution of the commands 601 and 602, the memory node 11 moves a head pointer 603 to the head position of the second payload included in the commands 601 and 602 in execution. For example, in the execution of the command 601, the head pointer 603 indicates the head position of the second payload included in the command 601 and in the execution of the command 602, the head pointer 603 indicates the head position of the second payload included in the command 602.

The memory node 11 includes a length pointer for managing the length of the data stored in the transmission payload region. For example, the memory node 11 stores the length pointer in the RAM 400. Then, the memory node 11 updates the length pointer on the basis of a prescribed rule. The memory node 11 calculates "Frame Size" included in the header of the packet on the basis of the value of the length pointer.

Figure 26:
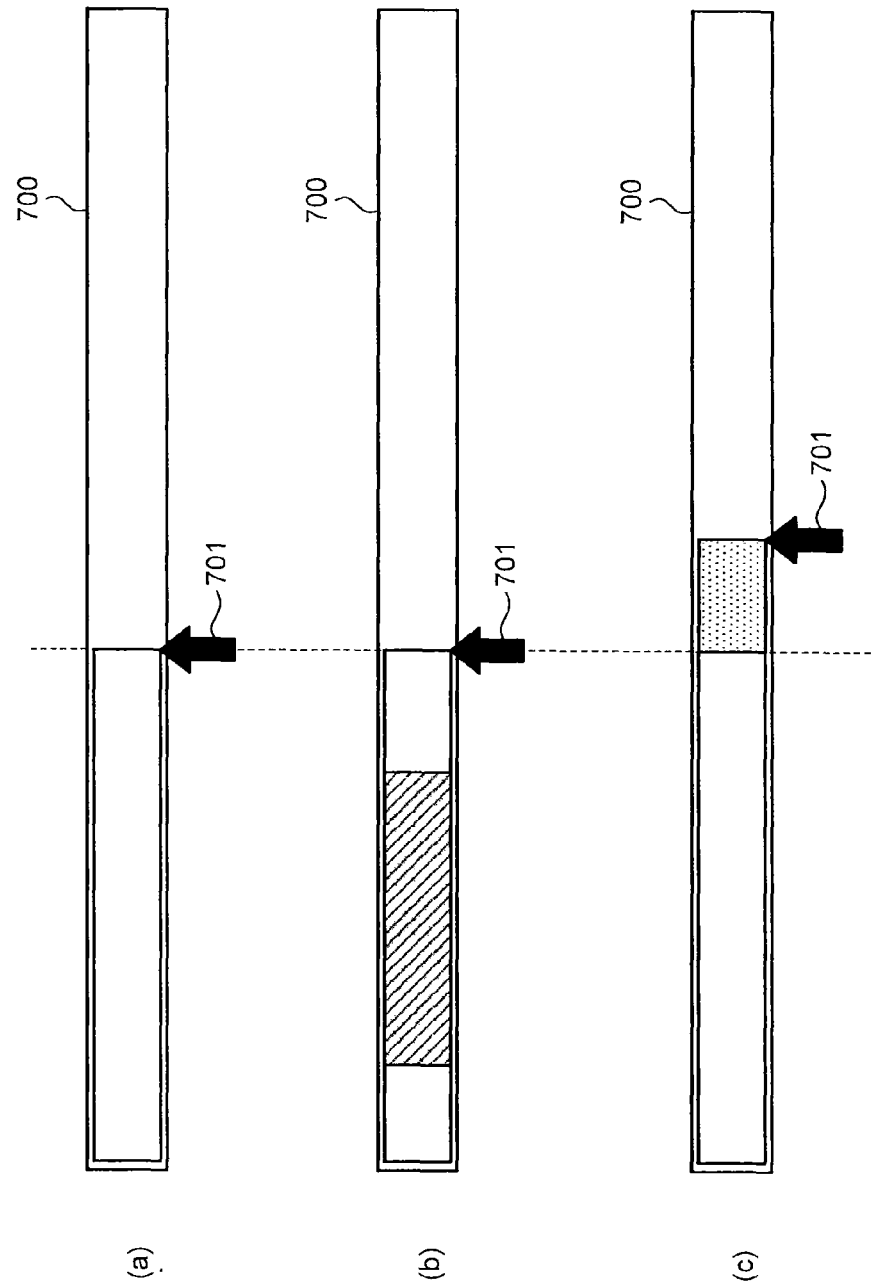
FIG. 26 is a diagram for explaining a rule for updating a length pointer.

FIG. 26 is a diagram for explaining the rule for updating the length pointer. A length pointer 701 indicates the end of valid data recorded in the transmission payload region 700 (see (a)). In "COPY", the writing position can be designated in the transmission payload region 700 by "ADDRESS". Therefore, even in the range where the valid data are already stored, the overwriting may happen by "COPY". Even in that case, if the range where the valid data are stored remains the same, the memory node 11 does not update the length pointer (see (b)). A region hatched with oblique lines in (b) corresponds to a region where the data are overwritten by "COPY". If there are partly or perfectly matched data as a result of executing "VARI_FILTER" or "FIX_FILTER", the memory node 11 stores that data in the position indicated by the length pointer 701 and moves the length pointer 701 toward the end of the transmission payload region 700 by the size of the stored data (see (c)). A region hatched with oblique lines in (c) corresponds to a region where the data are partly or perfectly matched.

(Sixth Embodiment)

Here, the description is made of the case where the controller 200 is configured by using an ASIC. The controller 200 is hereinafter referred to as a node module.

[RAM Configuration]

A system with an FPGA uses as the RAM, BRAM dedicated to the FPGA. Therefore, in the system with the ASIC, the RAM needs to be replaced by the RAM for the ASIC. Attention needs to be paid to the point that the RAM for the FPGA is Word/Byte write enabled while the RAM for the ASIC is controlled in the unit of bit. Some of the ASIC series are not applicable to the 2-port RAM. In this case, it is necessary to add the buffering function by preparing two 1-port RAMs. When the ASIC series are selected, attention needs to be paid as to whether the selected ASIC is applicable to the 2-port RAM.

Figure 27:
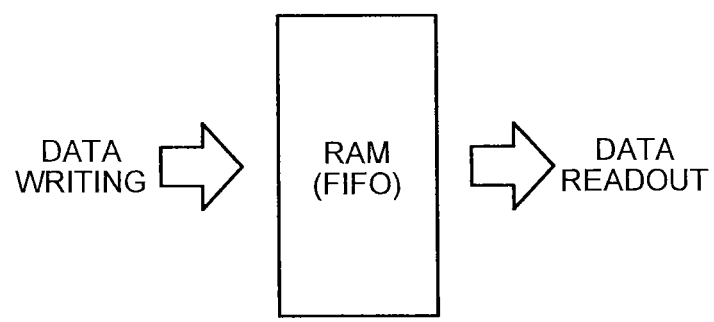
FIG. 27 is a diagram for explaining the state in which data are exchanged using 2-port RAM.
Figure 28:
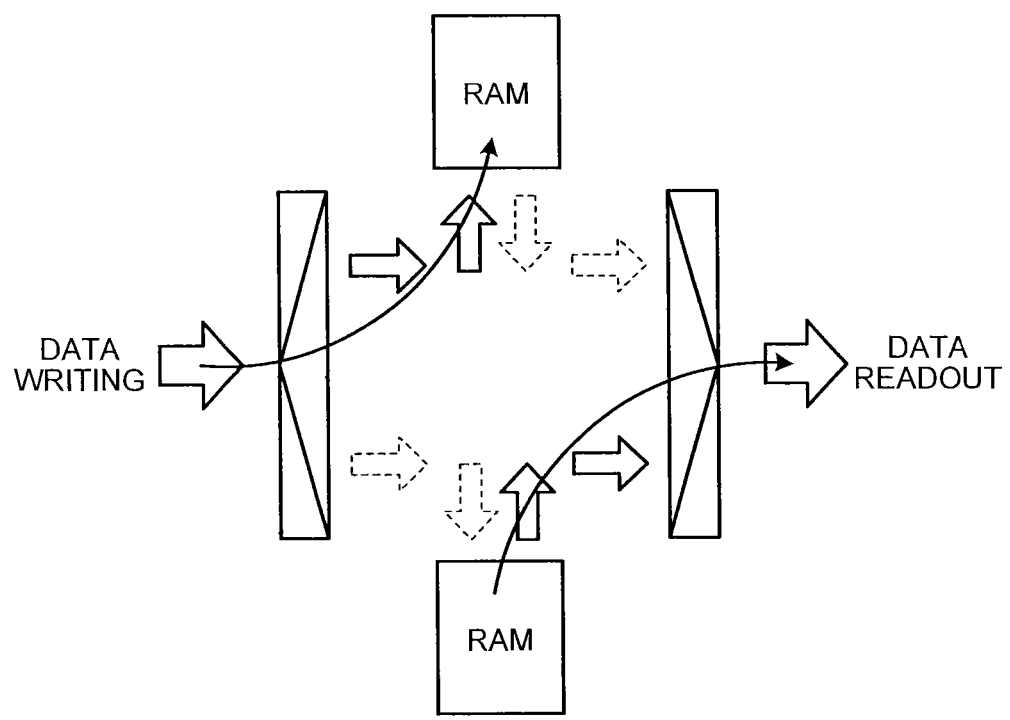
FIG. 28 is a diagram for explaining the state in which data are exchanged using two 1-port RAMs.

FIG. 27 is a diagram depicting the state in which data are exchanged using the 2-port RAM, and FIG. 28 is a diagram depicting the state in which data are exchanged using two 1-port RAMs.

[PLL Configuration]

A system with the FPGA employs the PLL module dedicated to the FPGA. Therefore, it is possible to generate the clocks combined freely. The PLL module for the ASIC generates radio frequency and the CLK configuration converts the frequency into a predetermined frequency and controls the converted frequency. It is necessary to add a test circuit (Mux circuit) for testing the function of the PLL module.

[CLK Configuration]

The system with the FPGA does not have the CLK configuration and the PLL module can deal with all the above process. The system with the ASIC needs to have a CLKGEN module providing the frequency to each module. This module performs controls such as the activation/stop of the PLL, and generates the low frequency such as ½, ¼, ⅛, etc. using a FlipFlop (FF) from the radio frequency input from the PLL module. Alternatively, the module generates other frequency using a counter.

In a system with the ASIC, a gating circuit is mounted that can turn on or off the clock relative to each module by the register control.

[I/O Configuration]

In the system with the FPGA, various I/O configurations ranging from a special I/O to a normal I/O can be selected as appropriate; however, the selection is not possible in the system with the ASIC. In particular, it is assumed that LVDS I/F between the node modules allows the communication at a speed of, for example, approximately 2 Gbps. For dealing with this communication, a dedicated I/O and a data reception circuit (Serializer/Deserializer) is necessary.

In the case of mounting high-speed RAM such as DDR/2/3 in the system with the ASIC, a PHY may be needed (analog circuit).

It is assumed that the signal capable of bidirectional communication controlled by GPIO is used in the general I/O of the system with the ASIC. PULLUP/PULLDOWN are also mounted with the special I/O that can be controlled by the register.

[RESET Configuration]

RESET configuration in the system with the ASIC may be the same as that of the system with the FPGA. The RESET module has a circuit synchronized with each frequency mounted thereon, the circuit resetting each module. It is assumed that, however, the system with the ASIC uses the main reset only when the node module is exchanged, which is different from the system with the FPGA. Therefore, in the system with the ASIC, the software reset or the like for each block and each port needs to be mounted.

For example, the module in which the sleep state is cancelled through the port may be activated after the software reset, or the module may be subjected to the software reset when the module is set to the Sleep state and then, the software reset may be cancelled before the Sleep state is cancelled to activate the module.

[TEST Configuration]

The system with the ASIC needs to have, as the TEST configuration, a function of checking the information of the state of the clock systems (PLL, CLKGEN) for the node module, the bit error of the mounted RAM, the NAND flash memory, etc., from the outside. The information of the RAM can be accessed using RAM BIST. The function of the PLL module can be checked using MUX control. The state of the NAND flash memory needs to be judged based on the history of the access from the node module, for example; therefore, in the case where the NAND flash memory and the node module are made into one chip, the system needs to have the function of allowing the access to the information.

[GatedClock Configuration]

The ON/OFF of the portion near the source of CLK is controlled by the register.

In the system with the ASIC, the node module conducts the link for each packet by detecting the head of the packet with LVDS I/F. Thus, the circuit on the inner side than the LVDS I/F can be stopped by GatedClock in the absence of the packet. The stopped circuit is restarted by activating the circuit with GatedClock by the incoming of the head of the packet, and the circuit is deactivated by GatedClock if the process of the packet is completed and the next packet has not arrived yet.

The RAM which the node module can access is deactivated by GatedClock and only when the node module accesses, GatedClock is enabled to activate the RAM.

In the case where the control signal is known in advance, for example, the FF for updating the plural bits for every several clocks, GatedClock can be incorporated using the control signal. It is necessary that GatedClock is mounted as the sub-module and is not mixed with the general circuits.

[Configuration of High-Speed Serial Transfer]

For the high-speed serial transfer, for example, LVDS using a differential signal is employed.

[Examination of Package]

Candidates for the package include 144 pin of a flat package; in the system with the ASIC, since a plurality of high-speed I/Fs is mounted, the package in which PIN is hidden inside, such as BGA, is desirable for avoiding the contact or noises.

The number of pins necessary for the SRAM, DDR/2/3, NAND I/F, and the like is determined in consideration of the address and the data width. Since this portion can be shared with another signal and the number of PINs may increase depending on the I/F, it is desirable not to mount the RAMs more than necessary.

As compared with the case where the NAND flash memory and DDR or SRAM, and the ASIC chip of the node module are arranged on one board, the mount area can be reduced when those are made into one chip in a multi-chip configuration, thereby reducing the number of PINs.

[Examination of Voltage]

In the system with the FPGA, the input into the NAND flash memory and the LVDS (Serializer/Deserializer) requires, for example, 3.3 V and the entirety is created based on this voltage. If the core voltage of the FPGA is different, the power needs to be provided after the voltage is converted by a DC-DC converter. In the system with the ASIC, a voltage of, for example, 1.5 V is assumed for the core power source and a voltage of, for example, 1.8 V is assumed for the I/O.

[Examination of Node Module Card]

It is assumed that one node module is mounted on a node module card. A node module card has a three-chip configuration including at least one NAND and at least one of SRAM or DRAM relative to one node module ASIC chip. The card has a DC-DC conversion chip, an LED display, and the like mounted therein. For allowing the node module to perform hot swapping, a connector for hot swapping is necessary in the connection to the mother board.

[Examination of Procedure of Data Transfer Between Node Modules]

In the system with the FPGA, communication is performed with 11 bits of data in which 3 bits of control signal between the node module ports is added to 8 bits of data. In the case where the interface with a bit width of 8 is employed for the I/F, this control signal between the ports cannot be used. In this case, there are two choices for the communication: the packet between the node modules is defined additionally; and the control information is added to the end of the packet to be transferred. In the latter case, the packet needs to be transferred and received for sharing the control signal, which increases the load. Thus, the former choice is desirable.

[Examination of Node Module GPIO]

In the system with the ASIC, an LED for notifying the information such as the state of the node module (OKAY/ERROR/Etc), DIP-SW for setting the mode information, and the like are mounted. DIP-SW performs the selection of the external RAM I/F (DDR/SRAM) and the access selection of NAND I/F (legacy/toggle DDR), for example.

In the system with the ASIC, it is desirable that DART or I2C is assigned in the GPIO for the test purpose so that the inside of the node module can be directly controlled.

[Examination of Node Module External Memory I/F]

For the node module external memory I/F, for example, DDR2 SDRAM is used in consideration of the speed, the chip voltage, and the like. As SRAM, etc., the memory with a power source voltage of 1.8 V is used, for example. For each of the plural RAMs, the dedicated PIN is designed. By selecting which one of the external memory I/Fs is activated, the plural RAMs can be individually accessed. When it is known that the PINs of SRAMs are not used at the same time, the PIN may be shared with another GPIO.

[Examination of System Configuration]

A blade server type system is configured by, for example, one or more system boxes each including a mother board that can have a plurality of daughter cards mounted thereon, the daughter card having one or more node modules and one or more connection units 14 mounted on the same board. The system boxes are connected to each other collectively at the back of the server, and are connected to the power source from the blade board side with an information connector.

By having the configuration in which the power source and the information connector are not disconnected at the back of the server even though the system box is extracted, the operation state can be continued even under the circumstance where the system box is extracted.

[Examination of Procedures for Setting the Coordinate of Node Module]

In the case of deciding the coordinate of the node module based on the positional relation with the adjacent node module, it is necessary to match the setting of the coordinate in each system box and the setting of the coordinate in the adjacent system box.

[Node Module for ASIC]

Figure 29:
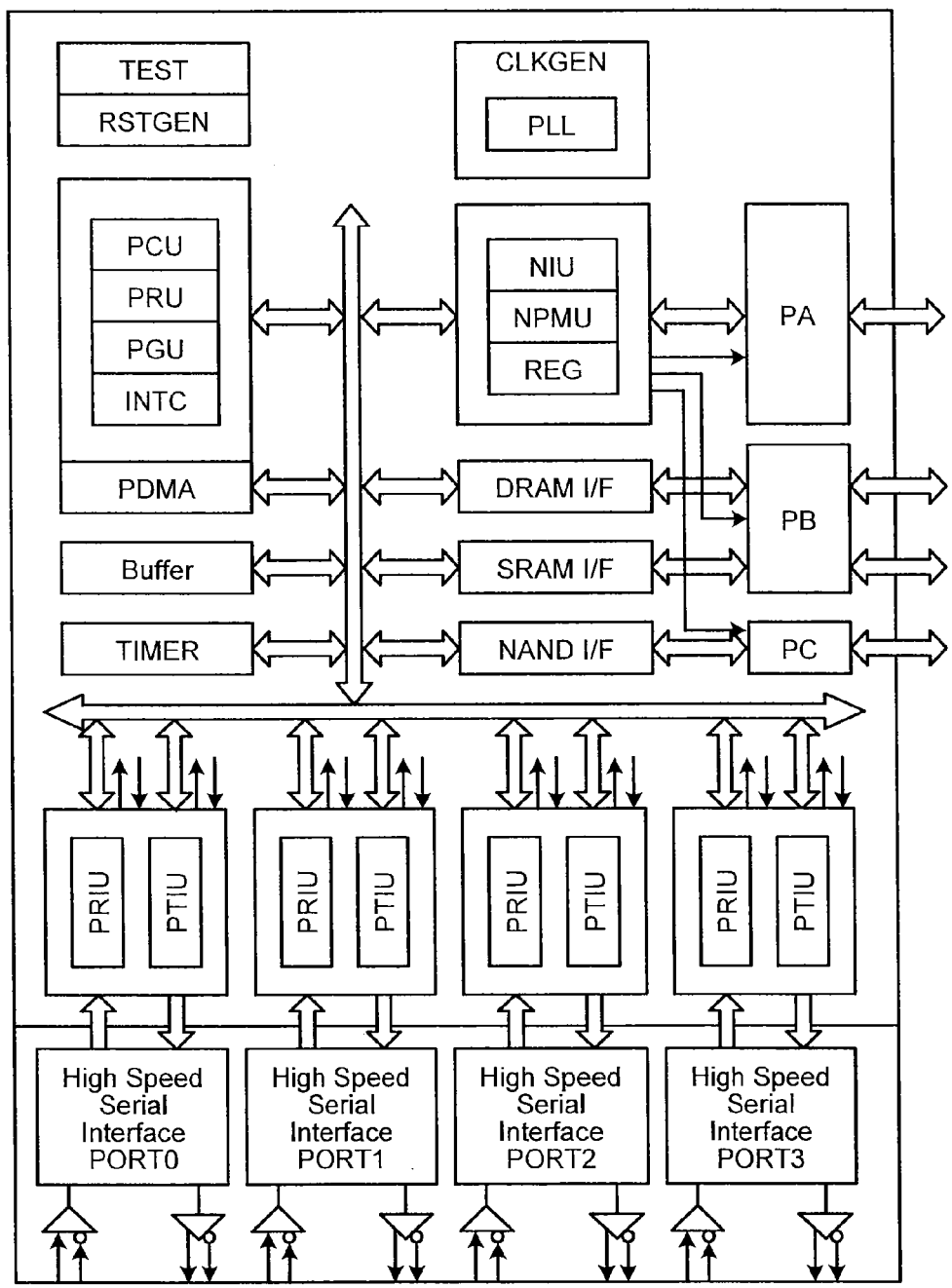
FIG. 29 is a diagram depicting an example of an internal configuration of a node module which is assumed to be made into ASIC.

FIG. 29 is a diagram depicting an example of the internal configuration of a node module which is assumed to be made into the ASIC. Note that PCU stands for a packet command unit, PRU stands for a packet routing unit, PGU stands for a packet generation unit, NIU stands for a node information unit, NPMU stands for a node power management unit, PDMA stands for a packet direct memory access, PRIU stands for a packet Rx interface unit, and PTIU stands for a packet Tx interface unit. Although not illustrated, the node module has PHAU (packet header analysis unit). PA, PB, and PC are assumed to be controlled by GPIO.

[High-Speed Serial Interface PORT [0 to 3]]

For example, quadratic phase sampling is performed on a serial differential signal of 1 Gbps, and synchronization is performed using the head of the packet, whereby the header information and the payload part of the transition are taken in. When those are taken in, the serial-parallel conversion is performed, so that the data are converted into 8 bits or 32 bits, and written in the RAM.

Upon the reception of the packet, PRIU conducts the CRC check as to whether the header is correct or not. If the header is correct, the OKAY packet (packet between PORTS) is notified via PTIU. In the case of ERROR, an ERROR packet (packet between PORTS) or a RETRY packet (packet between PORTS) is notified. If the header is determined to be correct and the coordinate to which the packet is transmitted is the own coordinate, the packet is notified (interrupted) to PCU (packet command unit). If the coordinate is another coordinate, the packet is notified (interrupted) to PRU (packet routing unit).

After that, the packet is copied by PDMA to a predetermined location based on the instruction from PCU and PRU. If the copy has been completed correctly, the OKAY response returns from PDMA and the packet on the RAM is deleted from PRIU. The delete in this case refers to the release of the RAM toward the high-speed serial interface.

[PTIU]

In PTIU, the packet from PDMA or the packet between PORTS from PRIU is written in the RAM. After the packet is stored in the RAM, the packet is transmitted from the high-speed serial interface side.

[PCU]

PCU reads out the header information of the packet stored in the port and analyzes the instruction by the notification (interruption) from each port. Based on the analysis results, PCU instructs PDMA to transfer the packet or analyzes the successive instructions embedded in the payload, thereby executing the instruction such as COPY, calculation, and retrieval.

[PRU]

PRU calculates the routing of the use port relative to the other coordinate or the return packet. Based on the information from the port packet and the circumstance of the own packet, for example, a four-directional port is examined. PRU also controls the packet limit value.

[PGU]

PGU constructs the packet upon the request from PCU or PRIU, and notifies (interrupts) to the instructed module.

[INTC]

INTC accepts the notification (interruption) from PRIU, PTIU, PDMA, etc. The processes are performed sequentially by the round-robin operation.

[NIU]

NIU accumulates the data flow and the status from each port of the node module and provides the information when inquired by PCU. Moreover, NIU manages the history information of the NAND access, etc.

[NPMU]

NPMU controls the power in the node module. This block automatically controls the stop control related to the function unused for a specified period. The function is restored from the function block such as PCU, PRIU, PTIU, PDMA, etc.

[PDMA]

The PDMA transfers the data with a specified size from the address of the transfer source to the address of the transfer destination according to the instruction (transfer command) from PRIU, PCU, or the like. Upon the completion of the transfer, PDMA notifies (interrupts) to the instruction source. The side having received the notification reads out the status information and confirms that the transfer has normally ended. The transfer command sets, along with the packet size, the command in which the transfer source and the transfer destination are combined. PDMA includes plural Chs.

[Buffer]

Buffer holds the packet, for example, and is formed of versatile internal RAM.

[TIMER]

TIMER is a timer for adjusting the timing. TIMER is used when the inquiry is made at specified intervals. The notification (interruption) is made when a count-down timer has become 0.

[Internal Bus]

An internal bus has Bus Matrix structure. A plurality of internal buses is defined so that the transfer of PDMA is not stopped. The structure of the internal bus is based on AHB.

[CLKGEN]

Figure 30:
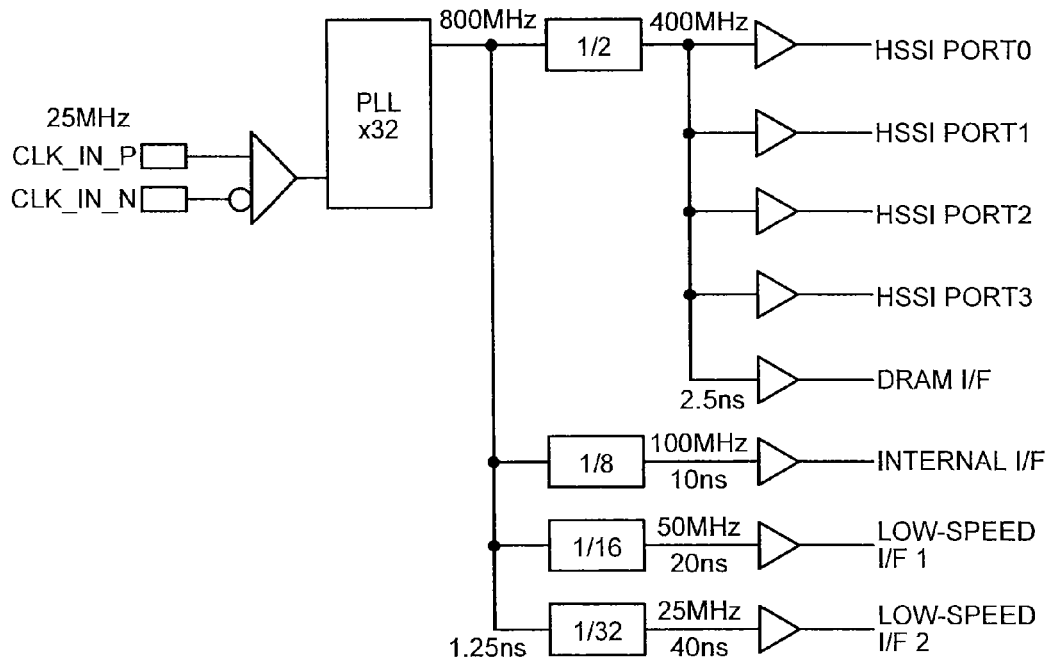
FIG. 30 is a diagram depicting a configuration of CLK-GEN.

CLKGEN generates the frequency of the high-speed serial interface and the various internal frequencies, and the clock for a low-speed device, such as GPIO. Note that GatedClock and the like are not included. A clock signal with GatedClock may be prepared for each function block. FIG. 30 depicts a configuration of CLKGEN.

[RSTGEN]

Figure 31:
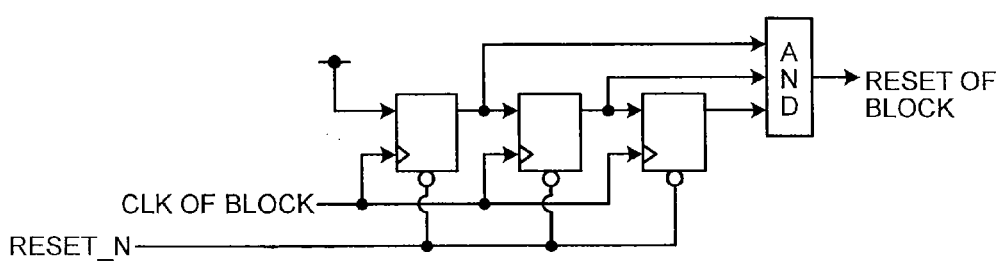
FIG. 31 is a diagram depicting a configuration of RST-GEN.

In RSTGEN, a RSTGEN circuit depicted in FIG. 31 is mounted. A circuit based on the rule of the ASIC needs to be mounted.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage device comprising:
a plurality of memory nodes each including nonvolatile memory, the plurality of memory nodes being connected to each other in two or more different directions; and
a first connection unit configured to transmit, to a first memory node to which the first connection unit is connected among the plurality of memory nodes, with a designation of a second memory node among the plurality of memory nodes, a command received from an external element, wherein
the first connection unit adds a first lifetime to the command, and transmits the command including the first lifetime to the first memory node,
a third memory node having received the command including the first lifetime among the plurality of memory nodes, in a case where the third memory node is not the second memory node, subtracts the first lifetime added to the command,
the third memory node discards the command including the first lifetime after the subtraction in a case where the first lifetime after the subtraction is less than a first threshold,
the third memory node transfers the command including the first lifetime after the subtraction to one of adjacent memory nodes in a case where the first lifetime after the subtraction is larger than the first threshold,
the third memory node, in a case where the third memory node is the second memory node, executes the command and transmits a response,
the first connection unit transmits information including a direction where the command is transmitted from the first memory node, and
the first connection unit, in a case where the first connection unit does not receive the response within a period after the transmission of the command changes the direction, transmits the information including the changed direction to the first memory node, and retransmits the command.

2. The storage device according to claim 1, wherein in a case where the first connection unit does not receive the response within the period after the retransmission of the command including the first lifetime, the first connection unit executes a time-out process.

3. The storage device according to claim 2, further comprising:
a second connection unit; and
an assigning unit configured to transmit the command to the first connection unit or the second connection unit, wherein
the time-out process is a process for transmitting a notification of discard of the command to the assigning unit,
the assigning unit transmits the command to the second connection unit upon the reception of the notification of discard,
the second connection unit adds a second lifetime of the command to the command and transmits the command including the second lifetime to a fourth memory node to which the second connection unit is connected among the plurality of memory nodes,
a fifth memory node having received the command including the second lifetime among the plurality of memory nodes, in a case where the fifth memory node is not the second memory node, subtracts the second lifetime
the fifth memory node, in a case where the second lifetime after the subtraction is less than a second threshold, discards the command including the second lifetime, and
the fifth memory node, in a case where the second lifetime after the subtraction is larger than the second threshold, transfers the command including the second lifetime after the subtraction to one of the adjacent memory nodes.

4. The storage device according to claim 1, wherein the first connection unit calculates the first lifetime on the basis of information including at least a position of the first memory node and a position of the second memory node.

5. The storage device according to claim 1, wherein the first connection unit calculates the period on the basis of information including at least a position of the first memory node and a position of the second memory node.

6. The storage device according to claim 1, wherein the third memory node selects the memory node to which the command is transferred, on the basis of information including at least a position of the third memory node, a position of the second memory node, and status information of the adjacent memory nodes.

7. A storage device comprising:
a plurality of memory nodes each including nonvolatile memory, the plurality of memory nodes being connected to each other in two or more different directions;
a first connection unit configured to transmit, to a first memory node to which the first connection unit is connected among the plurality of memory nodes, with a designation of a second memory node among the plurality of memory nodes, a command received from an external element;
a second connection unit; and
an assigning unit configured to transmit the command to the first connection unit or the second connection unit, wherein
the first connection unit adds a first lifetime to the command, and transmits the command including the first lifetime to the first memory node,
a third memory node having received the command including the first lifetime among the plurality of memory nodes, in a case where the third memory node is not the second memory node, subtracts the first lifetime added to the command,
the third memory node discards the command including the first lifetime after the subtraction in a case where the first lifetime after the subtraction is less than a first threshold,
the third memory node transfers the command including the first lifetime after the subtraction to one of adjacent memory nodes in a case where the first lifetime after the subtraction is larger than the first threshold,
the third memory node, in a case where the third memory node is the second memory node, executes the command and transmits a response,
the first connection unit, in a case where the first connection unit does not receive the response within a period after the transmission of the command, transmits a notification of discard of the command to the assigning unit,
the assigning unit transmits the command to the second connection unit upon the reception of the notification of discard, and the second connection unit adds a second lifetime of the command to the command and transmits the command including the second lifetime to a fourth memory node to which the second connection unit is connected among the plurality of memory nodes,
a fifth memory node having received the command including the second lifetime among the plurality of memory nodes, in a case where the fifth memory node is not the second memory node, subtracts the second lifetime added to the command,
the fifth memory node discards the command including the second lifetime after the subtraction in a case where the second lifetime after the subtraction is less than a second threshold, and
the fifth memory node transfers the command including the second lifetime after the subtraction to one of the adjacent memory nodes in a case where the second lifetime after the subtraction is larger than the second threshold.

8. The storage device according to claim 7, wherein the first connection unit calculates the first lifetime on the basis of information including at least a position of the first memory node and a position of the second memory node.

9. The storage device according to claim 7, wherein the second connection unit calculates the second lifetime on the basis of information including at least a position of the fourth memory node and a position of the second memory node.

10. The storage device according to claim 7, wherein the first connection unit calculates the period on the basis of information including at least a position of the first memory node and a position of the second memory node.

11. The storage device according to claim 7, wherein the third memory node selects the memory node to which the command is transferred, on the basis of information including at least a position of the third memory node, a position of the second memory node, and status information of the adjacent memory nodes.

* * * * *